United States Patent
Asano

(10) Patent No.: US 7,734,407 B2
(45) Date of Patent: Jun. 8, 2010

(54) APPARATUS FOR ACQUIRING LATERAL ACCELERATION AT THE CENTER OF GRAVITY OF VEHICLE, AND MOTION CONTROL APPARATUS FOR VEHICLE

(75) Inventor: Kenji Asano, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 836 days.

(21) Appl. No.: 11/583,029

(22) Filed: Oct. 19, 2006

(65) Prior Publication Data

US 2007/0106444 A1 May 10, 2007

(30) Foreign Application Priority Data

Nov. 4, 2005 (JP) .............................. 2005-320846

(51) Int. Cl.
*G06F 19/00* (2006.01)
*B60T 8/58* (2006.01)

(52) U.S. Cl. ......................................... 701/70; 303/146

(58) Field of Classification Search ....................... None
See application file for complete search history.

(56) References Cited

U.S. PATENT DOCUMENTS

| | | | | |
|---|---|---|---|---|
| 5,087,068 A | * | 2/1992 | Fukanaga et al. | 280/5.508 |
| 5,092,624 A | * | 3/1992 | Fukuyama et al. | 280/5.506 |
| 5,170,969 A | * | 12/1992 | Lin | 244/194 |
| 2004/0080209 A1 | * | 4/2004 | Leimbach et al. | 303/146 |
| 2004/0102888 A1 | | 5/2004 | Burgdorf et al. | |

FOREIGN PATENT DOCUMENTS

| JP | 11-326361 | * 11/1999 |
|---|---|---|
| JP | 2004-506572 | 3/2004 |

* cited by examiner

*Primary Examiner*—Michael J. Zanelli
(74) *Attorney, Agent, or Firm*—Buchanan Ingersoll & Rooney PC

(57) ABSTRACT

A center-of-gravity-position lateral acceleration acquisition apparatus of the invention is applied to a vehicle equipped with a lateral acceleration sensor which is installed at a position remote from the center of gravity of the vehicle and which detects lateral acceleration of the vehicle at that position. The apparatus acquires lateral acceleration of the vehicle at the center of gravity of the vehicle by correcting the detected lateral acceleration by making use of two relationships; i.e., a first relationship which holds among yaw rate of the vehicle, the lateral acceleration of the vehicle at the center of gravity of the vehicle, and the detected lateral acceleration, and a second relationship which holds between the yaw rate of the vehicle and the lateral acceleration of the vehicle at the center of gravity of the vehicle during a predetermined stable travel.

11 Claims, 10 Drawing Sheets

APPARATUS FOR ACQUIRING LATERAL ACCELERATION AT THE CENTER OF GRAVITY OF VEHICLE, AND MOTION CONTROL APPARATUS FOR VEHICLE

CROSS REFERENCE TO RELATED APPLICATION

This application is based on and claims under 35 U.S.C. sect, 119 with respect to Japanese Patent Application No. 2005-320846 filed on Nov. 4, 2005, the entire content of which is incorporated herein by reference.

BACKGROUND OF THE INVENTION

1. Field of the Invention

The present invention relates to a center-of-gravity-position lateral acceleration acquisition apparatus for acquiring lateral acceleration of a vehicle at the center of gravity of the vehicle through correction of lateral acceleration detected by a lateral acceleration sensor installed at a position remote from the center of gravity of the vehicle. The present invention also relates to a motion control apparatus for a vehicle which utilizes the center-of-gravity-position lateral acceleration acquisition apparatus.

2. Description of the Related Art

In general, in order to acquire a status of turning motion (turning behavior) of a vehicle, the lateral acceleration at the center of gravity of the vehicle and the yaw rate of the vehicle must be acquired. Since a detected value of the yaw rate of the vehicle is affected by the location on the vehicle body where the detection is performed, a yaw rate sensor for detecting the yaw rate of the vehicle need not be installed at (or in the vicinity of) the center of gravity of the vehicle.

On the contrary, a detected value of the lateral acceleration of the vehicle is affected by the location on the vehicular body where the detection is performed, because the vehicle in turning motion causes a rotational motion about its center of gravity (so-called spinning motion) in addition to an orbital motion. Therefore, if a lateral acceleration sensor for detecting the lateral acceleration of the vehicle is installed at a position remote from the center of the gravity of the vehicle, the lateral acceleration detected by the lateral acceleration sensor deviates from the lateral acceleration at the center of gravity of the vehicle by the amount corresponding to the above-described rotational motion. In other words, the lateral acceleration sensor must be installed at (or in the vicinity of) the center of gravity so as to directly detect the lateral acceleration at the center of gravity of the vehicle.

Recently, a technique has been developed for incorporating driving dynamics sensors, such as a yaw rate sensor and a lateral acceleration sensor, into a unit (hereinafter referred to as "an integrated unit") in which a hydraulic unit (HU) including a plurality of hydraulic devices, such as a plurality of solenoid valves and hydraulic pumps, necessary for hydraulic braking force control, is integrated with an electronic control apparatus (ECU) which controls the plurality of hydraulic devices (see, for example, Japanese Kohyo (PCT) Patent Publication No. 2004-506572). In general, such an integrated unit is often installed at a position remote from the center of gravity of the vehicle (for example, in an engine room). In this case, the lateral acceleration sensor is installed at a position remote from the center of gravity of the vehicle.

As described above, in order to acquire the lateral acceleration at the center of gravity of the vehicle in the case where the lateral acceleration sensor is installed at a position remote from the center of gravity of the vehicle, the lateral acceleration detected by the lateral acceleration sensor must be corrected by an "amount corresponding to the rotational motion" of the vehicle described above. It is widely known that "the amount corresponding to the rotational motion" can be represented by the deviation (a distance in the front-back direction of the vehicle body and a distance in the lateral direction of the vehicle body) of the lateral acceleration sensor from the center of gravity of the vehicle and the yaw rate of the vehicle (and a time-differentiated value of the yaw rate).

Accordingly, the lateral acceleration at the center of gravity of the vehicle (hereinafter refereed to "corrected center-of-gravity-position lateral acceleration") can be determined through correction of the detected lateral acceleration using the yaw rate detected by the yaw rate sensor. In this case, the yaw rate sensor must operate normally so as to obtain the corrected center-of-gravity-position lateral acceleration with high accuracy.

That is, in the case where an anomaly occurs with the yaw rate sensor and the detected yaw rate deviates from an appropriate value, the corrected center-of-gravity-position lateral acceleration cannot be acquired with high accuracy. In view of the above, it is desired to acquire the corrected center-of-gravity-position lateral acceleration through correction of the detected lateral acceleration without using the yaw rate detected by the yaw rate sensor.

Further, the following problem arises when the corrected center-of-gravity-position lateral acceleration is acquired by making use of the yaw rate detected by the yaw rate sensor. Here, a case is considered in which vehicle stabilization control for stabilizing motion of the vehicle (for example, over-steer/under-steer suppression control) is performed, and for example, a yaw rate deviation, which is a motion state quantity of the vehicle necessary for the above-described control, is obtained. Herein, the yaw rate deviation refers to a deviation between an actual yaw rate and a yaw rate (target yaw rate) determined from a speed of the vehicle and a steered angle of steerable wheels.

In addition, a case is considered in which, in order to prevent erroneous operation of the vehicle stabilization control due to occurrence of anomaly of the yaw rate sensor (that is, to provide redundancy to the control in order to cope with the anomaly of the yaw rate sensor), a first yaw rate deviation determined through direct use of the yaw rate detected by the yaw rate sensor and a second yaw rate deviation determined without direct use of the detected yaw rate are obtained, and both the yaw rate deviations are used for the vehicle stabilization control.

The first yaw rate deviation can be determined by directly using the detected yaw rate as the "actual yaw rate." The second yaw rate deviation can be determined by using, as the "actual yaw rate," a yaw rate estimated from the above-described corrected center-of-gravity-position lateral acceleration determined through correction of the lateral acceleration detected by the lateral acceleration sensor.

However, as described above, if the yaw rate detected by the yaw rate sensor is used in acquiring the corrected center-of-gravity-position lateral acceleration, the second yaw rate deviation will also be a value determined by indirectly using the detected yaw rate. In other words, as well as the first yaw rate deviation, the second yaw rate deviation may also be affected by the yaw rate detected by the yaw rate sensor.

Accordingly, in this case, it becomes impossible to provide redundancy to the control so as to cope with anomaly of the yaw rate sensor. From this viewpoint as well, it is desired to obtain the corrected center-of-gravity-position lateral acceleration through correction of the detected lateral acceleration without using the yaw rate detected by the yaw rate sensor.

SUMMARY OF THE INVENTION

The present invention has been accomplished in order to cope with the above-described drawbacks, and one of the objects of the present invention is to provide a center-of-gravity-position lateral acceleration acquisition apparatus which can acquire center-of-gravity-position lateral acceleration through correction of lateral acceleration detected by a lateral acceleration sensor installed at a position remote from the center of gravity of the vehicle without using yaw rate detected by a yaw rate sensor. Another object of the present invention is to provide a motion control apparatus for a vehicle which easily provides redundancy to the control in order to cope with anomaly of the yaw rate sensor, by using the center-of-gravity-position lateral acceleration acquisition apparatus.

The center-of-gravity-position lateral acceleration acquisition apparatus according to the present invention is applied to a vehicle equipped with a lateral acceleration sensor which is installed at a position remote from the center of gravity of the vehicle and which detects lateral acceleration of the vehicle generated at the position as the detected lateral acceleration.

The center-of-gravity-position lateral acceleration acquisition apparatus according to the present invention includes center-of-gravity-position lateral acceleration acquisition means (correction means plus acquisition means) for acquiring lateral acceleration of the vehicle at the center of gravity of the vehicle as the corrected center-of-gravity-position lateral acceleration, through correction of the detected lateral acceleration, utilizing a first relationship and a second relationship. The first relationship holds among the yaw rate of the vehicle, the lateral acceleration of the vehicle generated at the center of gravity of the vehicle, and the detected lateral acceleration. The second relationship holds between the yaw rate of the vehicle and the lateral acceleration of the vehicle generated at the center of gravity of the vehicle during a predetermined stable travel. The center-of-gravity-position lateral acceleration acquisition apparatus according to the present invention also includes correction means for correcting the detected lateral acceleration by making use of the first relationship and the second relationship; and acquisition means for acquiring the lateral acceleration generated at the center of gravity, as corrected center-of-gravity-position lateral acceleration, through the correction of the detected lateral acceleration.

Here, the above-described first relationship, for example, includes a known relationship that the lateral acceleration of the vehicle at the center of gravity of the vehicle is equal to a value determined by adding the above-described "amount corresponding to the rotational motion" to the detected lateral acceleration. The above-described "amount corresponding to the rotational motion" is represented by the amount of deviation of an installation position of the lateral acceleration sensor from the center of gravity of the vehicle (specifically, the amount of deviation in the front-back direction of the vehicle body and the amount of deviation in the lateral direction of the vehicle body) and the yaw rate of the vehicle (and the time-differentiated value of the yaw rate.) In addition, the above-described second relationship includes, for example, a relationship that the yaw rate of the vehicle is equal to a value determined by dividing the lateral acceleration at the center of gravity of the vehicle by a speed of the vehicle. This relationship holds when the rotational motion of the vehicle around its axis coincides with an orbital motion thereof (that is, when the time-differentiated value of a vehicle body slip angle is 0) during the predetermined stable travel. Note that the vehicle body slip angle is an angle created between the traveling direction of the vehicle body and the front-back direction of the vehicle body.

Deletion of the yaw rate of the vehicle from the above-described first and second relationships makes it possible to represent the relationship between the lateral acceleration at the center of gravity and the detected lateral acceleration without using the yaw rate of the vehicle. In other words, an equation can be obtained for determining the lateral acceleration at the center of gravity (that is, the corrected center-of-gravity-position lateral acceleration) through correction of the detected lateral acceleration without using the yaw rate of the vehicle.

The above-described center-of-gravity-position lateral acceleration acquisition means is configured on the basis of the foregoing finding. This center of position lateral acceleration acquisition means enables acquiring the corrected center-of-gravity-position lateral acceleration through correction of the lateral acceleration detected by the lateral acceleration sensor without using the yaw rate detected by the yaw rate sensor. Therefore, even if an anomaly occurs with the yaw rate sensor, the corrected center-of-gravity-position lateral acceleration can be continuously acquired with high accuracy.

In this case, the center-of-gravity-position lateral acceleration acquisition means is preferably configured to acquire the corrected center-of-gravity-position lateral acceleration by using, as the first relationship, a relationship obtained by omitting the term regarding the square of the yaw rate of the vehicle.

In the above-described well-known relationship (the first relationship), two terms exist as terms corresponding to the above-described "amount corresponding to the rotational motion." The two terms are: a term regarding "the product of the time-differentiated value of the yaw rate and the amount of deviation of the lateral acceleration sensor installation position from the center of gravity of the vehicle in the front-back direction of the vehicle body" and a term regarding "the product of the square of the yaw rate and the amount of deviation of the lateral acceleration sensor installation position from the center of gravity of the vehicle in the lateral direction of the vehicle body." Here, in a normal vehicular motion, the term regarding the square of the yaw rate tends to be considerably smaller compared to the term regarding the time-differentiated value of the yaw rate.

In other words, it is considered that the accuracy in calculation of the corrected center-of-gravity-position lateral acceleration will hardly decrease, even if the corrected center-of-gravity-position lateral acceleration is determined by making use of the relationship obtained by omitting the term regarding the square of the yaw rate in the above-described known relationship. The above-described structure is based on this finding. Since this structure makes it possible to simplify the equation for determining the corrected center-of-gravity-position lateral acceleration through correction of the detected lateral acceleration, the load of the CPU for calculating the corrected center-of-gravity-position lateral acceleration can be reduced.

Next, the motion control apparatus for a vehicle according to the present invention will be described. The motion control apparatus is applied to a vehicle equipped with a lateral acceleration sensor which is installed at a position remote from the center of gravity of the vehicle and which detects the lateral acceleration of the vehicle at the position as the detected lateral acceleration, and a yaw rate sensor for detecting the yaw rate of the vehicle as the detected yaw rate.

The motion control apparatus according to the present invention includes: estimated yaw rate calculation means (first calculation means) and motion control means. The estimated yaw rate calculation means calculates the estimated yaw rate of the vehicle on the basis of the above-described corrected center-of-gravity-position lateral acceleration obtained by using the above-described center-of-gravity-position lateral acceleration acquisition apparatus according to the present invention. The motion control means performs a vehicle stabilization control for stabilizing the motion of the vehicle, using a first motion state quantity of the vehicle calculated by using the detected yaw rate and a second motion state quantity of the vehicle calculated by using the estimated yaw rate.

Here, the estimated yaw rate calculation means is preferably configured to use a value determined by dividing the corrected center-of-gravity-position lateral acceleration by the speed of the vehicle as the estimated yaw rate. This means utilizes "the relationship that the yaw rate of the vehicle is equal to a value obtained by diving the lateral acceleration at the center of gravity of the vehicle by the speed of the vehicle," which relationship holds "when the time-differentiated value of the vehicle body slip angle is "0" (i.e., when the lateral slip angular speed of the vehicle does not change)."

According to the motion control apparatus according to the present invention, the first motion state quantity to be utilized for the vehicle stabilization control can be obtained directly from the detected yaw rate. On the other hand, the estimated yaw rate which is used for calculating the second motion state quantity to be utilized for the vehicle stabilization control is obtained by making use of the above-described corrected center-of-gravity-position lateral acceleration which is acquired without using the detected yaw rate. In other words, the second motion state quantity is a value that is not affected by the detected yaw rate.

Accordingly, by virtue of use of both the first motion state quantity and the second motion state quantity for the vehicle stabilization control, the motion control apparatus can be configured to prevent erroneous operation of the vehicle stabilization control, which erroneous operation would otherwise occur due to anomaly of the yaw rate sensor. That is, the motion control apparatus according to the present invention can easily provide redundancy to the vehicle stabilization control so as to cope with anomaly of the yaw rate sensor.

Preferably, the motion control apparatus according to the present invention further includes target yaw rate calculation means (second calculation means) for calculating a target yaw rate of the vehicle on the basis of the speed of the vehicle and the steered angle of the steerable wheels of the vehicle. In addition, the motion control means is preferably configured to use, as the first motion state quantity, the first yaw rate deviation which is a deviation between the target yaw rate and the detected yaw rate, and to use, as the second motion state quantity, the second yaw rate deviation which is a deviation between the target yaw rate and the estimated yaw rate.

Accordingly, the motion control means can be configured, for example, to determine a control quantity (such as a brake hydraulic pressure) associated with the vehicle stabilization control on the basis of a smaller one of the first yaw rate deviation and the second yaw rate deviation.

With this configuration, even in the case where an anomaly occurs with the yaw rate sensor (and therefore, with the detected yaw rate), and thus a situation occurs where the first yaw rate deviation is calculated as a value greater than an appropriate value, the control quantity associated with the vehicle stabilization control is determined on the basis of the second yaw rate deviation which is not affected by the detected yaw rate (and which is therefore smaller than the first yaw rate deviation.) As a result, it is possible to prevent erroneous operation of the vehicle stabilization control, which would otherwise occur due to anomaly of the yaw rate sensor (specifically, the state in which the control quantity is calculated to assume an excessively large value).

Alternatively, the motion control means may be configured to start the vehicle stabilization control when both the first yaw rate deviation and the second yaw rate deviation are greater than a threshold.

Accordingly, as is the case with the above, even if a situation occurs where anomaly occurs with the yaw rate sensor and thus the first yaw rate deviation is calculated as a value greater than an appropriate value, the vehicle stabilization control is not started unless the second yaw rate deviation (which is smaller than the first yaw rate deviation and which is not affected by the detected yaw rate) exceeds the above-described threshold. As a result, it is possible to prevent erroneous operation of the vehicle stabilization control, which would otherwise occur due to anomaly of the yaw rate sensor (specifically, the situation where the vehicle stabilization control is started too early).

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

Embodiments of a motion control apparatus for a vehicle including a center-of-gravity-position lateral acceleration acquisition apparatus according to the present invention will be described with reference to the drawings.

First Embodiment

Figure 1:
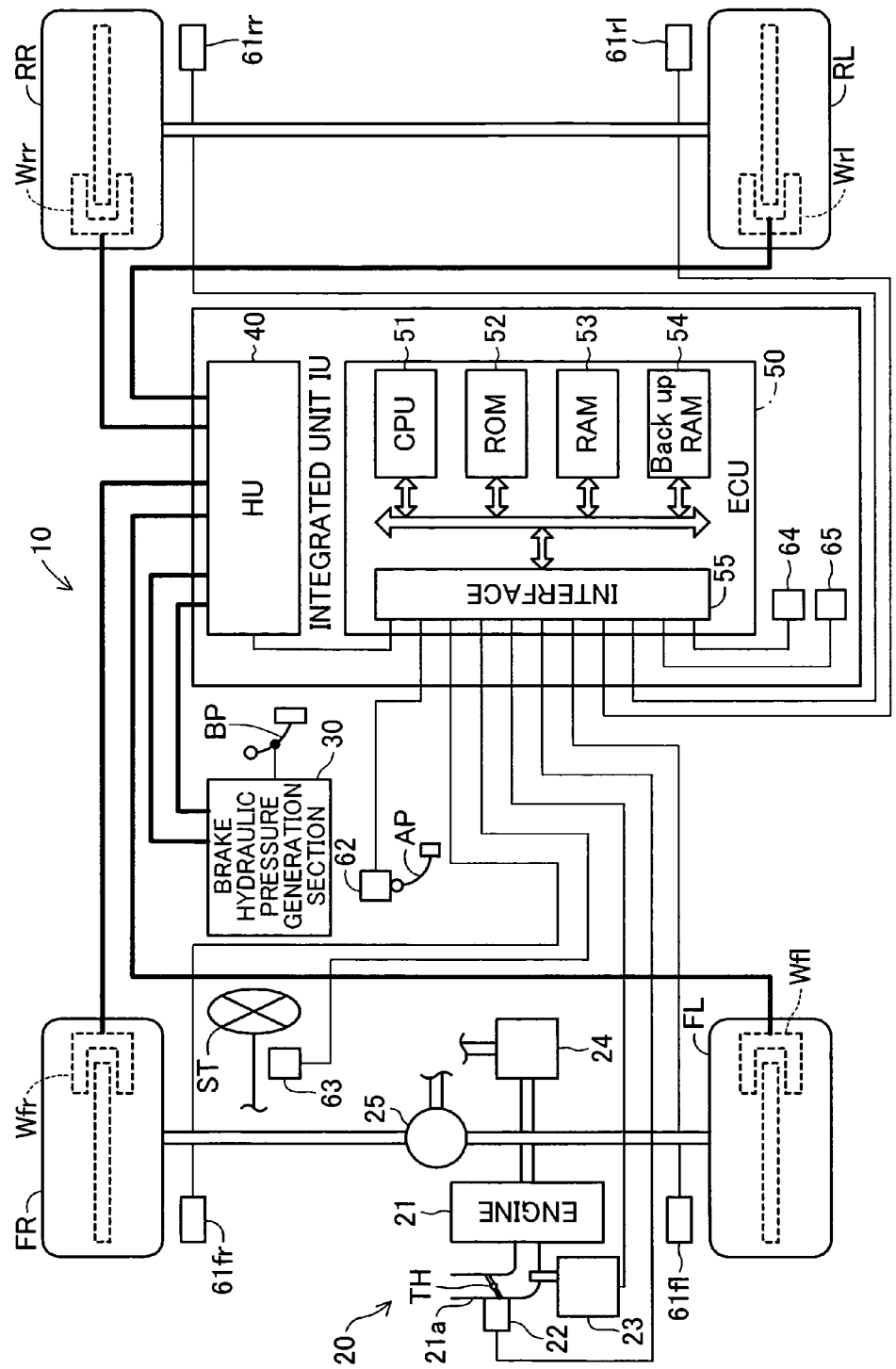
FIG. 1 is a schematic diagram of a vehicle equipped with a motion control apparatus for a vehicle according to a first embodiment of the present invention.

FIG. 1 schematically shows the structure of a vehicle equipped with a motion control apparatus 10 according to a first embodiment of the present invention. The illustrated vehicle is a front-wheel drive (FF) vehicle.

This motion control apparatus 10 includes a drive force transmission mechanism 20 for generating drive force and transmitting the drive force to two front wheels FL, FR, which are driven wheels, respectively; a brake hydraulic pressure generation section 30 for generating brake hydraulic pressure in each wheel in accordance with braking operation of a driver; and an integrated unit IU in which a hydraulic unit 40 (hereinafter simply referred to as "HU 40") is integrated with an electronic controller 50 (hereinafter simply referred to as "ECU 50"). The integrated unit IU is installed at a position remote from the center of gravity of the vehicle (in an engine room in the present embodiment).

The drive force transmission mechanism 20 includes: an engine 21 for generating drive force; a throttle valve actuator 22 which is installed in an intake pipe 21a of the engine 21 and which controls an opening TA of a throttle valve TH which varies an opening section area of an intake passage; and a fuel injection unit 23 including an injector for injecting fuel to the vicinity of an unillustrated intake port of the engine 21.

In addition, the drive force transmission mechanism 20 includes a transmission 24 whose input shaft is connected to the output shaft of the engine 21; and a front-wheel-side differential 25 which is connected to the output shaft of the transmission 24 and which properly distribute the drive force of the engine 21 to the front wheels FL and FR.

Figure 2:
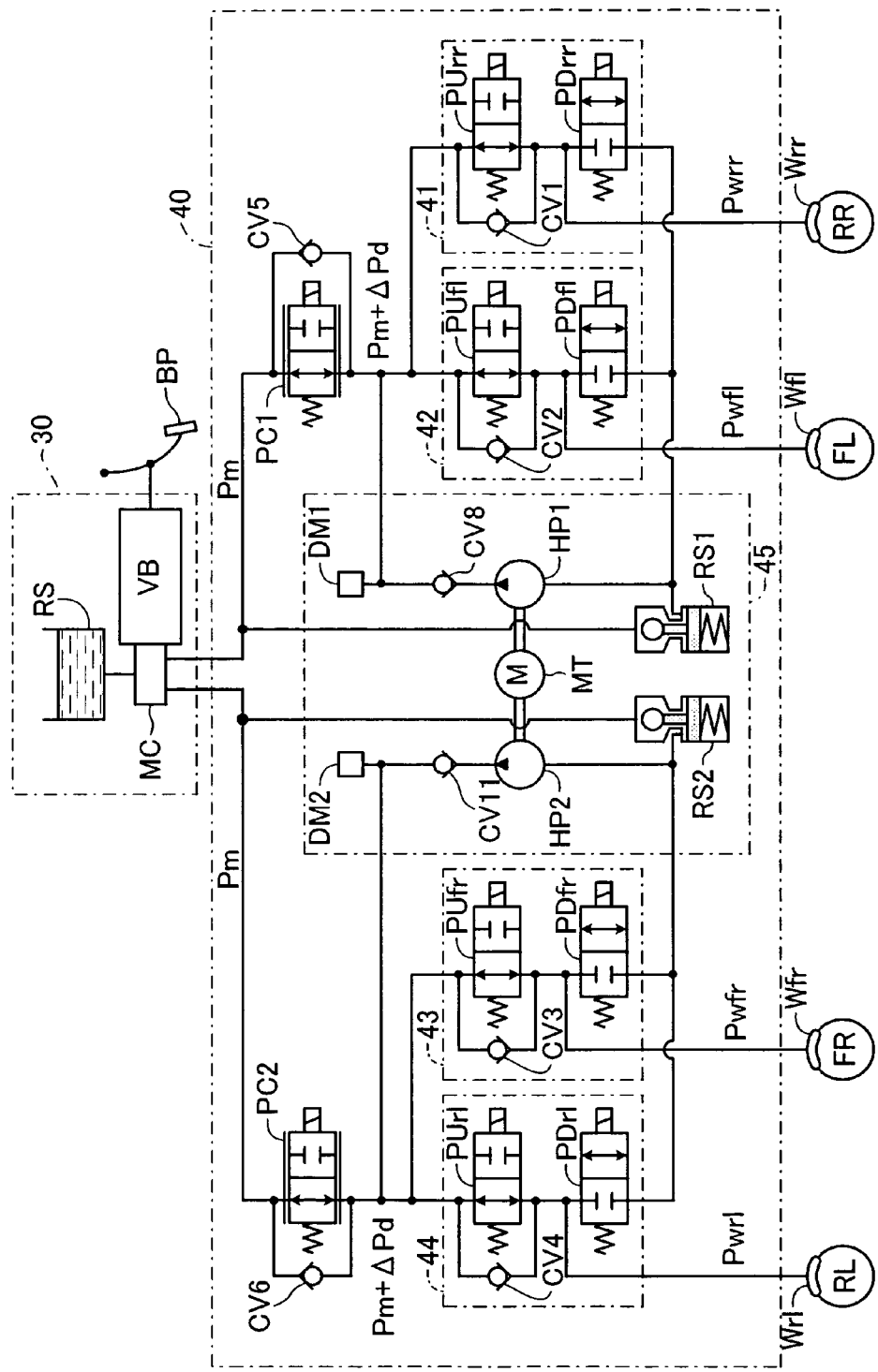
FIG. 2 is a schematic diagram of a brake hydraulic pressure generation section and a hydraulic unit shown in FIG. 1.

As schematically shown in FIG. 2, the brake hydraulic pressure generation section 30 includes a vacuum booster VB which operates in response to operation of a brake pedal BP, and a master cylinder MC which is linked to the vacuum booster VB. The vacuum booster VB utilizes the pressure (negative pressure) of air within the intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder pressure Pm corresponding to the boosted operating force. The master cylinder MC also generates from the second port a second master cylinder pressure Pm which is substantially the same as the first master cylinder pressure Pm and which corresponds to the boosted operating force.

The structures and operations of the master cylinder MC and the vacuum booster VB are well known, and therefore an explanation of the details thereof will be omitted. In this manner, the master cylinder MC and the vacuum booster VB generate first and second master cylinder pressures corresponding to the operating force of the brake pedal BP.

As schematically shown in FIG. 2, the HU 40 includes an RR brake hydraulic pressure adjusting section 41, an FL brake hydraulic pressure adjusting section 42, an FR brake hydraulic pressure adjusting section 43, an RL brake hydraulic pressure adjusting section 44, which can adjust the brake hydraulic pressures supplied to corresponding wheel cylinders Wrr, Wfl, Wfr and Wrl respectively installed on the wheels RR, FL, FR, and RL respectively; and a return brake fluid supply section 45.

The first port of the above-described master cylinder MC belongs to a system related to the wheels RR, FL, and a normally-open linear solenoid valve PC1 is interposed between the first port and the upstream side of the RR brake hydraulic pressure adjusting section 41 and the upstream side of the FL brake hydraulic pressure adjusting section 42. Similarly, the second port of the master cylinder MC belongs to a system related to the wheels FR, RL, and a normally-open linear solenoid valve PC2 is interposed between the second port and the upstream side of the FR brake hydraulic pressure adjusting section 43 and the upstream side of the RL brake hydraulic pressure adjusting section 44. Details of such normally-open linear solenoid valves PC1, PC2 will be described later.

The RR brake hydraulic pressure adjusting section 41 consists of a pressure-increasing valve PUrr, which is a normally-open solenoid valve of a 2-port, 2-position type, and a pressure-reducing valve PDrr, which is a normally-closed solenoid valve of a 2-port, 2-position type. The pressure-increasing valve PUrr establishes or brakes communication between the upstream side of the RR brake hydraulic pressure adjusting section 41 and the wheel cylinder Wrr. The pressure-reducing valve PDrr establishes or breaks communication between the wheel cylinder Wrr and a reservoir RS1. As a result, the brake hydraulic pressure in the wheel cylinder Wrr (the wheel cylinder pressure Pwrr) can be increased, maintained, or decreased through control of the pressure-increasing valve PUrr and the pressure-reducing valve PDrr.

In addition, a check valve CV1 which allows flow of the brake fluid in only one direction from the wheel cylinder Wrr side to the upstream side of the RR brake hydraulic pressure adjusting section 41 is connected in parallel with the pressure-increasing valve PUrr. As a result, when the brake pedal BP is released after being operated, the wheel cylinder pressure Pwrr is rapidly decreased.

Similarly, the FL brake hydraulic pressure adjusting section 42, the FR brake hydraulic pressure adjusting section 43, and the RL brake hydraulic pressure adjusting section 44 include a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. By controlling each pressure-increasing valve and pressure-reducing valve, the brake hydraulic pressures in the wheel cylinder Wfl, the wheel cylinder Wfr, and the wheel cylinder Wrl (the wheel cylinder pressures Pwfl, Pwfr, Pwrl) can be increased, maintained, or decreased, respectively. Check valves CV2, CV3, and CV4 are provided in parallel with the pressure-increasing valves PUfl, PUfr, and PUrl, respectively, to provide the same function as that of the check valve CV1.

The return brake fluid supply section 45 includes a DC motor MT, and two hydraulic pumps (gear pumps) HP1 and HP2 simultaneously driven by the motor MT. The hydraulic pump HP1 pumps the brake fluid returned from the pressure reducing values PDrr and PDfl to the reservoir RS1, and supplies the pumped brake fluid to the upstream sides of the RR brake hydraulic pressure adjusting section 41 and the FL brake hydraulic pressure adjusting section 42 via a check valve CV8.

Similarly, the hydraulic pump HP2 pumps the brake fluid returned from the pressure reducing valves PDfr and PDrl to the reservoir RS2, and supplies the pumped brake fluid to the upstream sides of the FR brake hydraulic pressure adjusting section 43 and the RL brake hydraulic pressure adjusting section 44 via a check valve CV11. Notably, in order to reduce pulsations of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 will be described. Force in the opening direction on the basis of biasing force of an unillustrated coil spring is always acting on a valve body of the normally-open linear solenoid valve PC1. In addition, force in the opening direction on the basis of a difference pressure determined by subtracting the first master cylinder pressure Pm from the pressure at the upstream side of the RR brake hydraulic pressure adjusting section 41 and the upstream side of the FL brake hydraulic pressure adjusting section 42 (which, hereinafter, may be simply referred to as "an actual difference pressure" as well as force in the closing direction on the basis of attraction force which proportionally increases in accordance with current applied to the normally-open linear solenoid valve PC1 (therefore, instruction current Id) are also acting on the valve body of the normally-open linear solenoid valve.

Figure 3:
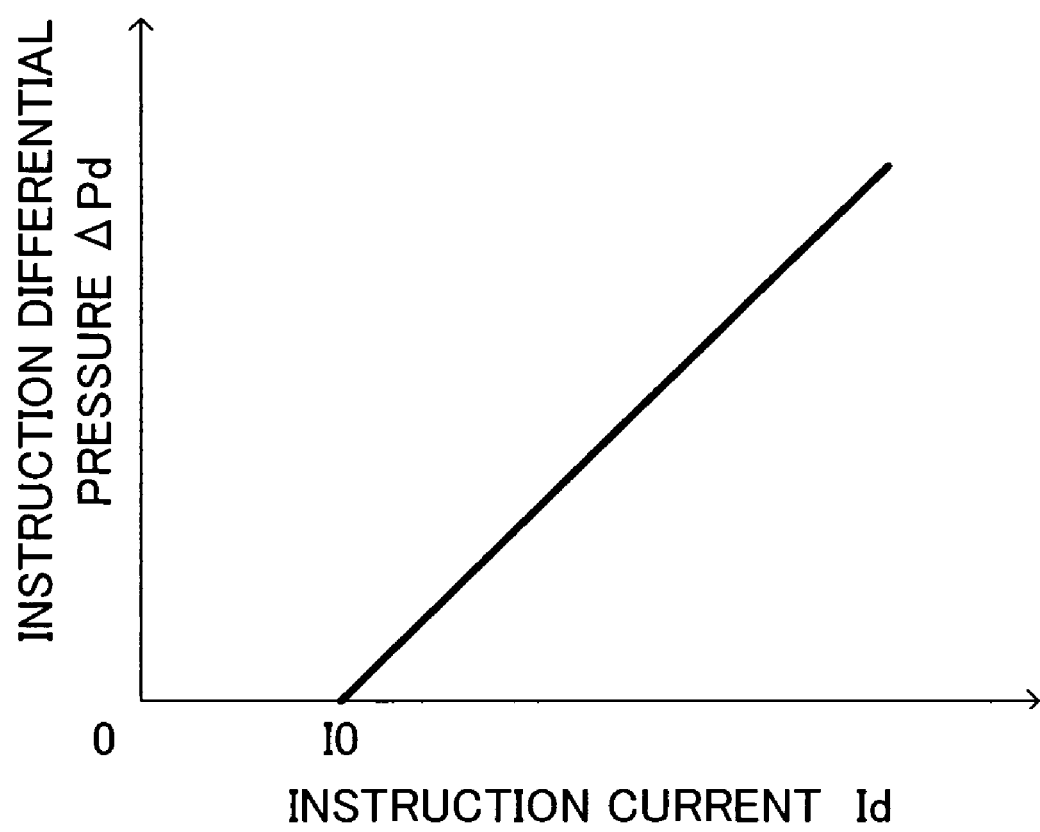
FIG. 3 is a graph indicating the relationship between instruction current and instruction difference pressure for the normally-open linear solenoid valve shown in FIG. 2.

As a result, as shown in FIG. 3, an instruction differential pressure ΔPd corresponding to the above-described attraction force is determined so as to increase in proportion to the instruction current Id. 10 refers to a current value corresponding to the biasing force of the above-described coil spring. When the instruction differential pressure ΔPd is greater than the above-described actual differential pressure, the normally-open linear solenoid valve PC1 is closed so as to break communication between the first port of the master cylinder MC and the upstream side of the RR brake hydraulic pressure adjusting section 41 and the upstream side of the FL brake hydraulic pressure adjusting section 42.

On the other hand, when the instruction differential pressure ΔPd is smaller than the above-described actual differential pressure, the normally-open linear solenoid valve PC1 is opened so as to establish communication between the first port of the master cylinder MC and the upstream side of the RR brake hydraulic pressure adjusting section 41 and the upstream side of the FL brake hydraulic pressure adjusting section 42. As a result, brake fluid (which is supplied from the hydraulic pump HP1) in the upstream side of the RR brake hydraulic pressure adjusting section 41 and the upstream side of the FL brake hydraulic pressure adjusting section 42 flows via the normally-open linear solenoid valve PC1 to the first port side of the master cylinder MC. Because of this, the actual differential pressure can be adjusted so as to decrease and coincide with the instruction differential pressure ΔPd. Notably, the brake fluid that has flowed in the first port side of the master cylinder MC is returned to the reservoir RS1.

In other words, when the motor MT (and thus the hydraulic pumps HP1, HP2) are being driven, the above-described actual pressure (i.e., the allowable maximum value of the actual pressure) can be controlled corresponding to the instruction current Id supplied to the normally-open linear solenoid valve PC1. At this time, the pressure at the upstream side of the RR brake hydraulic pressure adjusting section 41 and the upstream side of the FL brake hydraulic pressure adjusting section 42 assumes a value (Pm+ΔPd) determined by adding the actual difference pressure (and therefore the instruction difference pressure ΔPd) to the first master cylinder pressure Pm.

On the other hand, when the normally-open linear solenoid valve PC1 is brought into a non-excited state (that is, when the instruction current Id is set to "0"), the normally-open linear solenoid valve PC1 maintains the open state because of the biasing force of the coil spring. At this time, the actual difference pressure becomes "0," and the pressure at the upstream side of the RR brake hydraulic pressure adjusting section 41 and the upstream side of the FL brake hydraulic pressure adjusting section 42 becomes equal to the first master cylinder pressure Pm.

The normally-open linear solenoid valve PC2 also has a similar structure and operation as those of the normally-open linear solenoid valve PC1. Accordingly, when the motor MT (and therefore, the hydraulic pumps HP1, HP2) is being driven, in response to supply of the instruction current Id to the normally-open linear solenoid valve PC2, the pressure at the upstream side of the FR brake hydraulic pressure adjusting section 43 and the upstream side of the RL brake hydraulic pressure adjusting section 44 assumes a value (Pm+ΔPd) determined by adding the instruction difference pressure ΔPd to the second master cylinder pressure Pm. On the other hand, when the normally-open linear solenoid valve PC2 is brought into a non-excited state, the pressure at the upstream side of the FR brake hydraulic pressure adjusting section 43 and the upstream side of the RL brake hydraulic pressure adjusting section 44 becomes equal to the second master cylinder pressure Pm.

In addition, a check valve CV5 which allows flow of the brake fluid in only one direction from the first port of the master cylinder MC to the upstream side of the RR brake hydraulic pressure adjusting section 41 and the upstream side of the FL brake hydraulic pressure adjusting section 42 is connected in parallel with the normally-open linear solenoid valve PC1. As a result, even while the actual difference pressure is being controlled in accordance with the instruction current Id supplied to the normally-open linear solenoid valve PC1, when the first master cylinder pressure Pm becomes higher than the pressure at the upstream side of the RR brake hydraulic pressure adjusting section 41 and the upstream side of the FL brake hydraulic pressure adjusting section 42 because of the operation of the brake pedal BP, the brake hydraulic pressure corresponding to the operation force of the brake pedal BP (i.e., the first master cylinder pressure Pm), as it is, is supplied to the wheel cylinders Wrr and Wfl. In addition, a check valve CV6 capable of achieving a similar function as the above-described check valve CV5 is disposed in parallel to the normally-open linear solenoid valve PC2.

With the structure as described above, the HU 40 consists of two hydraulic circuit system; i.e., a system for the rear right wheel RR and the front left wheel FL and a system for the rear left wheel RL and the front right wheel FR. The HU 40 is capable of supplying each wheel cylinder W** with the brake hydraulic pressure corresponding to the operation force of the brake pedal BP (that is, the master cylinder pressure Pm), when all solenoid valves are in the non-excited state.

Notably, the symbol "" appended to various variables and the like collectively represents the symbols fl, fr, rl, and rr and indicates that the particular variable or the like applies to all of the wheels FR, FL, etc. of the vehicle. For example, the wheel cylinder W collectively indicates the front left wheel cylinder Wfl, the front right wheel cylinder Wfr, the rear left wheel cylinder Wrl, and the rear right wheel cylinder Wrr.

On the other hand, when the motor MT (and therefore the hydraulic pumps HP1, HP2) is driven in this state and the normally-open linear solenoid valves PC1 and PC2 are excited with the instruction current Id, the HU 40 supplies each wheel cylinder W** with a brake hydraulic pressure which is higher than the master cylinder pressure Pm by the instruction differential pressure ΔPd which is determined in accordance with the instruction current Id.

In addition, the HU 40 is capable of individually controlling wheel cylinder pressures PW by controlling the pressure-increasing valves PU and the pressure-reducing valves PD. That is, the HU 40 is capable of adjusting the braking force applied to individual wheels independently of the operation of the brake pedal BP by the driver. As a result, the HU 40 is capable of achieving a vehicle stabilization control (specifically, an under-steer or over-steer suppress control) on the basis of the instruction from the ECU 50**.

Referring back to FIG. 1, the ECU 50 is a micro computer including a CPU 51, ROM 52 which stores routines (programs) executed by the CPU 51, tables (lookup tables, maps), constants and the like, RAM 53 in which the CPU 51 temporarily stores data, backup RAM 54 in which data are stored when power is on and which retains the stored data when the power is turned off, and an interface 55 including AD converters and the like. These components are connected with one another via a bus.

The interface 55 is connected to vehicle wheel speed sensors 61, an accelerator opening sensor 62, and a steering angle sensor 63, which are separated from the integrated IU, via a harness, a connector or the like so as to allow CAN communication. In addition, the interface 55 is electrically connected directly to a yaw rate sensor 64 and a lateral acceleration sensor 65 that are integrated in the integrated unit IU without using harnesses or connectors. That is, the yaw rate sensor 64 and the lateral acceleration sensor 65** are installed at a position remote from the center of gravity of the vehicle.

Each of the wheel speed sensors 61* is a sensor of an electromagnetic pickup type, which outputs a signal having a frequency corresponding to the wheel speed of the wheel. The accelerator opening sensor 62 detects the amount of operation of an accelerator pedal AP which is operated by the driver, and outputs a signal indicating the amount of operation Accp of the accelerator pedal AP. The steering angle sensor 63** detects a rotational angle with respect to a neutral position of a steering wheel ST and outputs a signal indicating a steering angle θs.

The yaw rate sensor 64 detects a yaw rate of the vehicle and outputs a signal indicating a detected yaw rate Yrs. The lateral acceleration sensor 65 detects a lateral acceleration of the vehicle at the installation position of the lateral acceleration sensor 65 (therefore, at the installation position of the integrated unit IU) and outputs a signal indicating the detected lateral acceleration at the installation position of the integrated unit IU (hereinafter referred to as an "detected IU-position lateral acceleration Gys."

The steering angle θs is "0" when the steering wheel ST is at the neutral position, assumes a positive value when the steering wheel ST is rotated in the counter-clockwise direction (viewed from the driver) with respect to the neutral position, and assumes a negative value when the steering wheel ST is rotated in the clockwise direction with respect to the neutral position.

The detected yaw rate Yrs assumes a positive value when the vehicle is turning left (in the counter-clockwise direction viewed from the top of the vehicle) and assumes a negative value when the vehicle is turning right. In addition, the detected IU-position lateral acceleration Gys assumes a positive value when the vehicle is turning left (in the counter-clockwise direction viewed from the top of the vehicle) and assumes a negative value when the vehicle is turning right.

The interface 55 receives signals from the sensors 61 to 65 and supplies them to the CPU 51. The interface 55 sends drive signals to the individual electromagnetic valves and the motor MT of the HU 40, the throttle valve actuator 22 and the fuel injection unit 23 in accordance with the instructions from the CPU 51.

Accordingly, the throttle valve actuator 22 drives the throttle valve TH in such a manner that the opening TA of the throttle valve TH in principle corresponds to the operation amount Accp of the accelerator pedal AP. In addition, the fuel injection unit 23 injects fuel of an amount necessary for obtaining a predetermined target air fuel ratio (for example, the theoretical air fuel ratio) with respect to an cylinder interior air amount, which is the amount of air taken into the cylinder. In addition, the instruction current Id (the current supplied) to the above-described normally-open linear solenoid valves PC1 and PC2 is adjusted through adjustment of the duty ratio of the current supplied.

Figure 4:
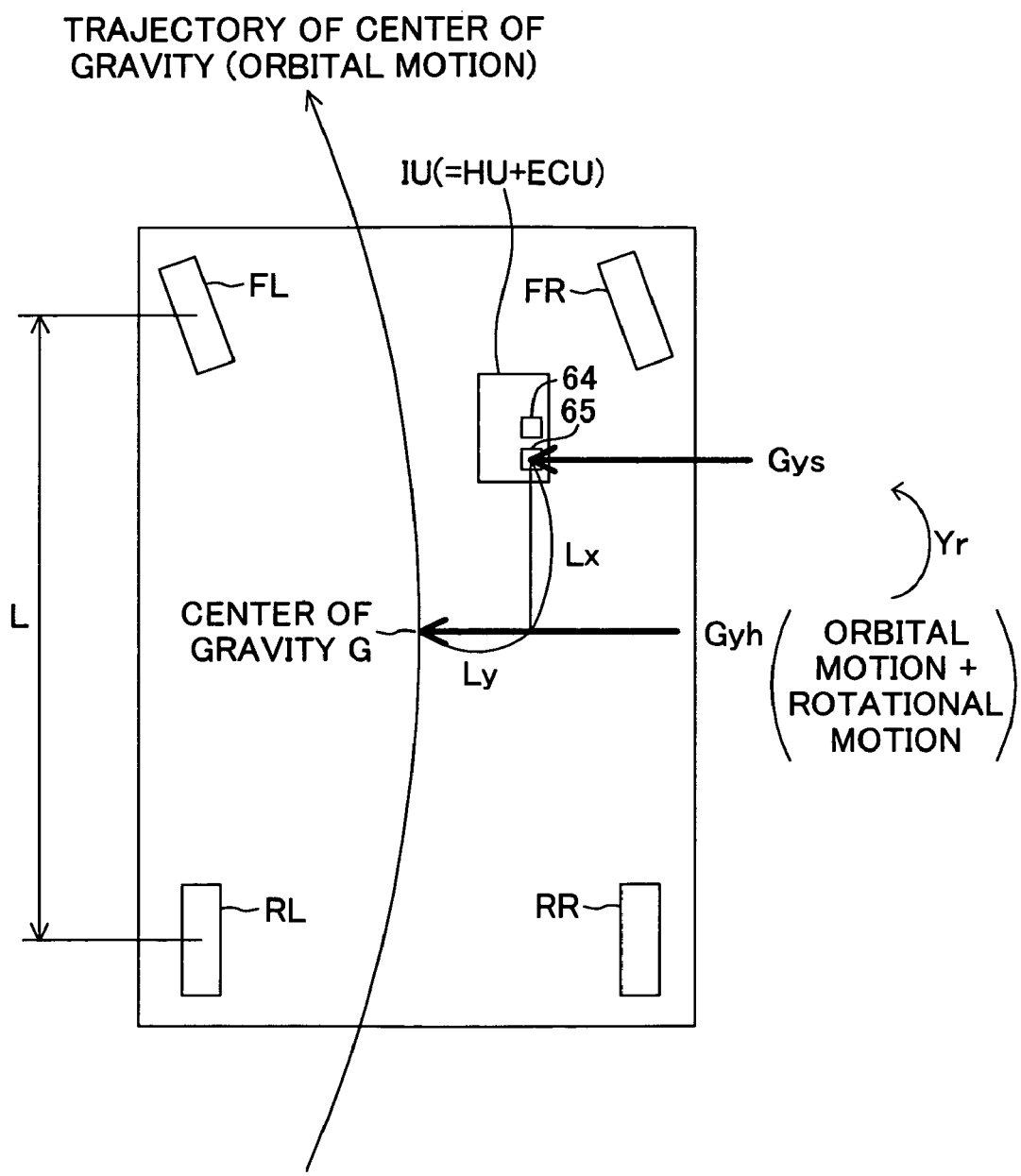
FIG. 4 is a diagram for describing the relationship between lateral acceleration detected by a lateral acceleration sensor and lateral acceleration at the center of gravity of a vehicle.

Method of Acquiring Center-of-gravity-position Lateral Acceleration Through Correction of Detected IU-position Lateral Acceleration Gys Next, with reference to FIG. 4, there will be described a method executed by the motion control apparatus 10 according to the embodiment of the present invention having the above-described structure (hereinafter, referred to as "the present apparatus") in order to calculate the lateral acceleration at the center of gravity G of the vehicle (hereinafter referred to as "corrected center-of-gravity-position lateral acceleration Gyh" by correcting the IU-position lateral acceleration Gys obtained from the lateral acceleration sensor 65.

In general, it is well known that the following Eq. 1 (the first relationship) can be established from a known vehicle model for a vehicle which causes a rotational motion around the center of gravity G in addition to an orbital motion. In Eq. 1, Lx indicates a deviation of the installation position of the lateral acceleration sensor 65 from the center of gravity G in the front-back direction of the vehicle body, and Ly indicates a deviation of the installation position of the lateral acceleration sensor 65 from the center of gravity G in the lateral direction of the vehicle body. Yr indicates the yaw rate of the vehicle. In the following Eq. 1, the second term and the third term of the right-hand side correspond to "the amount corresponding to the rotational motion" described above.

$$Gyh = Gys - Lx \cdot \frac{dYr}{dt} + Ly \cdot Yr^2 \qquad \text{Eq. 1}$$

The yaw rate Yr of the vehicle is needed when the corrected center-of-gravity-position lateral acceleration Gyh is calculated by correcting the detected IU-position lateral acceleration Gys using the above-described Eq. 1. The yaw rate sensor 64 must operate normally (therefore, the detected yaw rate Yrs must be normal) for accurate calculation of the corrected center-of-gravity-position lateral acceleration Gyh by making use of the yaw rate detected by the yaw rate sensor 64 as the yaw rate Yr.

Therefore, when an anomaly occurs with the yaw rate sensor 64 and thus the detected yaw rate Yrs deviates from an appropriate value, the corrected center-of-gravity-position lateral acceleration Gyh cannot be accurately calculated using the above-described Eq. 1. In other words, in order to continue accurate calculation of the corrected center-of-gravity-position lateral acceleration Gyh even after the yaw rate sensor 64 becomes anomalous, the corrected center-of-gravity-position lateral acceleration Ghy must be determined through correction of the detected IU-position lateral acceleration Gys without using the yaw rate detected by the yaw rate sensor 64. Accordingly, the present apparatus determines the corrected center-of-gravity-position lateral acceleration Gyh without using the detected yaw rate Yrs according to the following method.

In the above-described Eq. 1, the second term of the right-hand side corresponding to "the amount corresponding to the rotational motion" is the product of the time-differentiated value dYr/dt of the yaw rate Yr and the deviation Lx in the front-back direction of the vehicle body. Further, the third term of the right-hand side corresponding to "the amount corresponding to the rotational motion" is the product of the square $Yr^2$ of the yaw rate Yr and the deviation Ly in the lateral direction of the vehicle body. Herein, in a normal vehicular motion, the square value $Yr^2$ of the yaw rate Yr tends to be considerably smaller than the time-differentiated value dYr/dt of the yaw rate. In addition, since the integrated unit IU is installed in the engine room, the deviation Ly in the lateral direction of the vehicle body, in general, tends to become smaller than the deviation Lx in the front-back direction of the vehicle body.

From the description above, the value of the third term of the right-hand side tends to be considerably smaller than the value of the second term of the right-hand side in Eq. 1. Therefore, the following Eq. 2 (the first relationship) obtained by omitting the third term of the right-hand side of Eq. 1 is used.

$$Gyh = Gys - Lx \cdot \frac{dYr}{dt} \qquad \text{Eq. 2}$$

Incidentally, a case where the vehicle is traveling stably (that is, where a constant vehicle body slip angle is maintained, i.e., where the time-differentiated value of the vehicle body slip angle is "0") will be considered. In this case, it is widely known that the following Eq. 3 (the second relationship) is satisfied. In Eq. 3, V is the speed of the vehicle.

$$Yr = \frac{Gyh}{V} \qquad \text{Eq. 3}$$

The following Eq. 4 is obtained by substituting the above-described Eq. 3 to the above-described Eq. 2. Through discretization of Eq. 4 with the minute time Δt (program execution period), the following Eq. 5 is obtained. In Eq. 5, the suffix (k) denotes the present value, and the suffix (k−1) denotes the previous value. (Hereinafter, the same applies to other variables.) The following Eq. 6 can be obtained by solving Eq. 5 for Gyh(k).

$$Gyh = Gys - Lx \cdot \frac{d(Gyh/V)}{dt} \qquad \text{Eq. 4}$$

$$Gyh(k) = Gys(k) - Lx \cdot \frac{(Gyh(k)/V(k)) - (Gyh(k-1)/V(k-1))}{\Delta t} \qquad \text{Eq. 5}$$

$$Gyh(k) = \frac{Gys(k) \cdot \Delta t \cdot V(k) \cdot V(k-1) + Gyh(k-1) \cdot Lx \cdot V(k)}{\Delta t \cdot V(k) \cdot V(k-1) + Lx \cdot V(k-1)} \qquad \text{Eq. 6}$$

As described above, the above-described Eq. 6 obtained from the above-described Eq. 2 and Eq. 3 is an equation for determining the corrected center-of-gravity-position lateral acceleration Gyh through correction of the detected IU-position lateral acceleration Gys without using the yaw rate Yr. The present apparatus determines the corrected center-of-gravity-position lateral acceleration Gyh in accordance with Eq. 6 without using the yaw rate detected by the yaw rate sensor 64.

Notably, as can be understood from the above-described Eq. 6, when the speed V of the vehicle is constant (that is, when V(k)=V(k−1)=constant value), the format of Eq. 6 takes a format in which the corrected center-of-gravity-position lateral acceleration Gyh is determined through execution of first-order low path filter processing on the detected IU-position lateral acceleration Gys. That is, in this case, the corrected center-of-gravity-position lateral acceleration Gyh changes with a delay corresponding to the time constant of the above-described first-order low-path filter processing with respect to a change in the detected IU-position lateral acceleration Gys.

Figure 5:
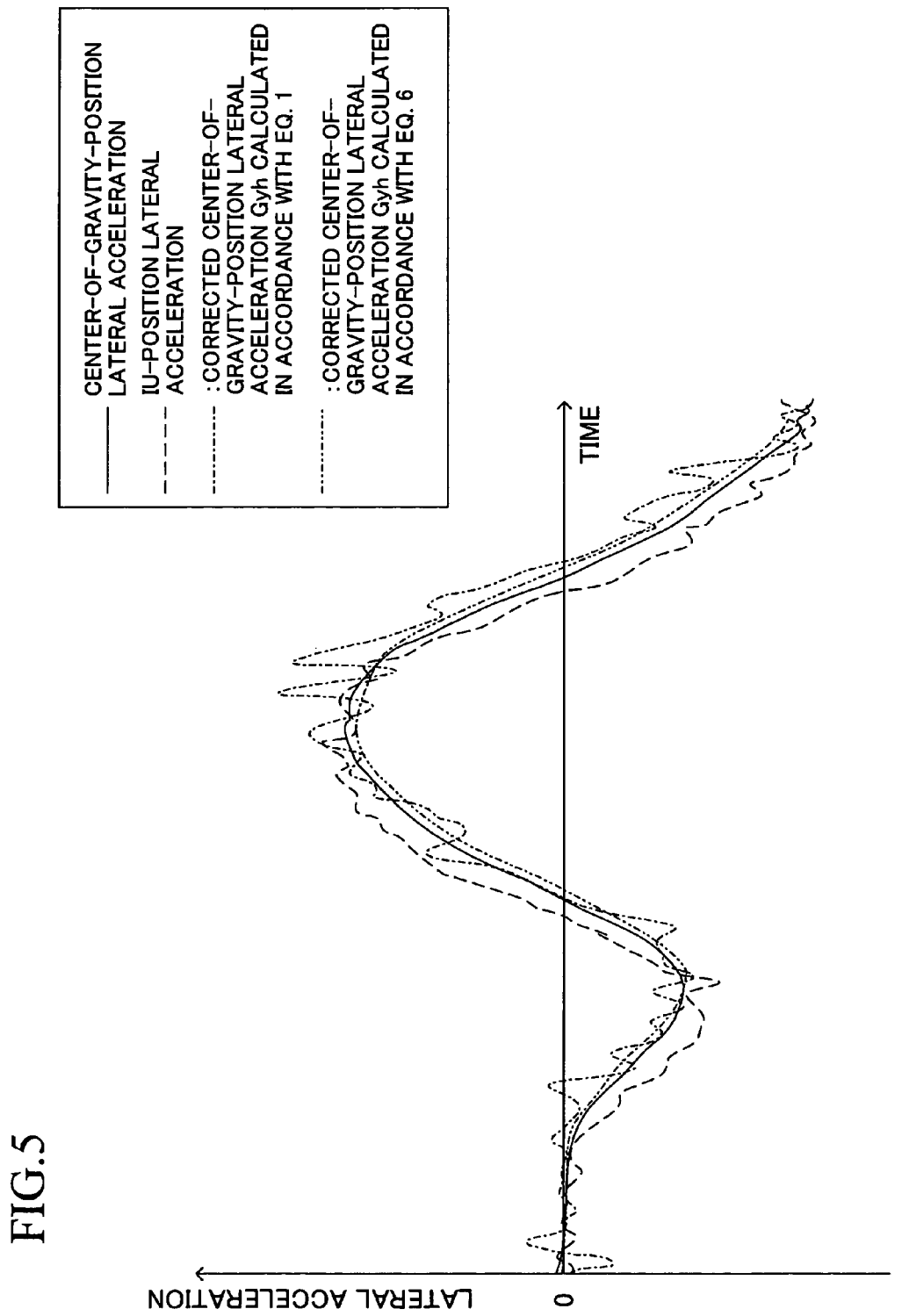
FIG. 5 is a graph showing results of a simulation performed by use of a predetermined vehicle model so as to obtain changes in various lateral accelerations of a vehicle in the case where the vehicle is caused to turn under a predetermined condition.

FIG. 5 is a graph showing results of a simulation performed by use of a predetermined vehicle model so as to obtain changes in various lateral accelerations of a vehicle in the case where the vehicle is caused to turn under a predetermined condition. In FIG. 5, the solid line indicates the lateral acceleration at the center of gravity G of the vehicle (the center-of-gravity-position lateral acceleration), the broken line indicates the lateral acceleration at the installation position of the integrated unit IU (the IU-position lateral acceleration), and the alternate long and short dash line indicates the corrected center-of-gravity-position lateral acceleration Gyh determined through correction of the above-described IU-position lateral acceleration by using an equation corresponding to the above-described Eq. 1 and, and the alternate long and two short dashes line indicates the corrected center-of-gravity-position lateral acceleration Gyh determined through correction of the above-described IU-position lateral acceleration by using an equation corresponding to the above-described Eq. 6. Therefore, the alternate long and two short dashes line corresponds to the corrected center-of-gravity-position lateral acceleration Gyh calculated by the present apparatus.

As can be understood from FIG. 5, the corrected center-of-gravity-position lateral acceleration Gyh (indicated by the alternate long and two short dashes line) calculated by the present apparatus includes a smaller amount of noise as compared to the corrected center-of-gravity-position lateral acceleration Gyh determined by using the above-described Eq. 1 (indicated by the alternate long and short dash line). In addition, it substantially coincides with the center-of-gravity-position lateral acceleration (indicated by the solid line). Notably, the corrected center-of-gravity-position lateral acceleration Gyh (indicated by the alternate long and two short dashes line) has a phase lag with respect to the IU-position lateral acceleration (indicated by the broken line). This is cased by the effect corresponding to the above-described first-order low path filter processing. The above is the method performed by the present apparatus in order to calculate the corrected center-of-gravity-position lateral acceleration Gyh through correction of the detected IU-position lateral acceleration Gys acquired from the lateral acceleration sensor 65.

Outline of Vehicle Stabilization Control

Next, under-steer suppression control and over-steer suppression control, that are the vehicle stabilization controls executed by the present apparatus, will be described. In the present embodiment, the under-steer suppression control (hereinafter also referred to as "the US suppression control") refers to a control for providing the hydraulic pressure brake to the rear wheel located on the inner side with respect to a turning locus when the vehicle is in the under-steer state so as to suppress the under-steer state, thereby to maintain a turning-locus tracing performance. Further, the over-steer suppression control (hereinafter also referred to as "the OS suppression control") refers to a control for providing the hydraulic pressure brake to the front wheel located on the outer side of the turning locus when the vehicle is in the over-steer state so as to suppress the over-steer state, thereby to maintain turning stability.

The present apparatus calculates a yaw rate deviation ΔYr (=Yrt−Yr) which is a deviation or difference between the target yaw rate Yrt and the actual yaw rate Yr as a motion state quantity of the vehicle which is necessary for the above-described OS-US suppression control. The present apparatus determines the target yaw rate Yrt according to the following Eq. 7 which is derived from the motion model of the vehicle.

$$Yrt = \frac{V \cdot \theta s}{n \cdot L} - Kh \cdot Gyh \cdot V \qquad \text{Eq. 7}$$

In the above-described Eq. 7, L indicates a wheel base of the vehicle (see FIG. 4), Kh indicates a stability factor, and n indicates a steering gear ratio. The wheel base L, the stability factor Kh, and the steering gear ratio n are constants that are determined according to the vehicle specifications. The target yaw rate Yrt is set in such a manner that it assumes a positive value when the vehicle is turning left (that is, when the steering angle θs is a positive value), it assumes a negative value when the vehicle is turning right (that is, when the steering angle θs is a negative value). As described above, the target yaw rate Yrt is determined on the basis of the steering angle θs (accordingly, the steered angle of the steerable wheels (θs/n)) and the speed V of the vehicle.

Notably, in Eq. 7, the first term in the right-hand side is a term corresponding to the theoretical value of the yaw rate when the vehicle is turning on a flat road in the state where both the steering angle θs and the speed V of the vehicle are constant (during a steady turning). In addition, the second term in the right-hand side is a correction term assuming that the vehicle is running on a cant road.

In addition, when determining the yaw rate deviation ΔYr, the present apparatus determines a first yaw rate deviation ΔYr1 determined according to the following Eq. 8 and a second yaw rate deviation ΔYr2 determined according to the following Eq. 9.

$$\Delta Yr1 = Yrt - Yrs \qquad \text{Eq. 8}$$

$$\Delta Yr2 = Yrt - Yrest \qquad \text{Eq. 9}$$

In the above-described Eq. 8, the value Yrs, which is used as the above-described actual yaw rate Yr, is the yaw rate detected by the yaw rate sensor 64. Therefore, the first yaw rate deviation ΔYr1 is a value affected by the yaw rate detected by the yaw rate sensor 64.

On the other hand, in Eq. 9, the value Yrest, which is used as the above-described actual yaw rate Yr, is the estimated yaw rate Yrest calculated according to the following Eq. 10 on the basis of the corrected center-of-gravity-position lateral acceleration Gyh calculated using the above-described Eq. 6. The following Eq. 10 is an equation which can be obtained on the basis of the relationship shown in the above-described Eq. 3 which is satisfied "when the vehicle is stably running."

$$Yrest = \frac{Gyh}{V} \qquad \text{Eq. 10}$$

As described above, the corrected center-of-gravity-position lateral acceleration Gyh calculated using the above-described Eq. 6 is calculated without using the yaw rate detected by the yaw rate sensor 64. Accordingly, as can be understood from the above-described Eq. 10, the estimated yaw rate Yrest is not affected by the detected yaw rate Yrs, either. Therefore, as can be understood easily from the above-described Eq. 9 (and Eq. 7), the second yaw rate deviation ΔYr2 is not affected by the yaw rate detected by the yaw rate sensor 64, either.

Further, the present apparatus sets the yaw rate deviation for control ΔYrmin to either of the first yaw rate deviation ΔYr1 or the second yaw rate deviation ΔYr2 which has a smaller absolute value. Next, on the basis of the yaw rate deviation for control ΔYrmin, the present apparatus determines whether to start the OS-US suppression control and determines the hydraulic braking force (the control quantity) to be applied under the OS-US suppression control. The details of the operation will be described referring to the flowchart to be described later.

As described above, both the first yaw rate deviation ΔYr1 which is affected by the yaw rate detected by the yaw rate sensor 64 and the second yaw rate deviation ΔYr2 which is not affected by the detected yaw rate Yrs are used for the OS-US suppression control. Thus, the present apparatus can have a structure capable of preventing erroneous operation of the OS-US suppression control because of occurrence of anomaly of the yaw rate sensor.

Specifically, even if a situation occurs in which an anomaly occurs with the yaw rate sensor 64 (and therefore, with the detected yaw rate Yrs) and the first yaw rate deviation ΔYr1 is calculated as a value greater than an appropriate value, the hydraulic braking force under the OS-US suppression control is determined on the basis of the second yaw rate deviation ΔYr2 (which is smaller than the first yaw rate deviation ΔYr1) which can be maintained at an appropriate value without being affected by the detected yaw rate Yrs. As a result, it becomes possible to prevent occurrence of a situation in which the hydraulic braking force is calculated as an excessively large value because of occurrence of abnormally of the yaw rate sensor 64. In other words, redundancy can be provided in order to cope with anomaly of the yaw rate sensor 64 under the OS-US suppression control. The foregoing description is the outline of the vehicular stability control executed by the present apparatus.

Actual Operation

Next, the actual operation of the motion control apparatus 10 according to the first embodiment of the present invention having the above-described structure will be described while referring to FIGS. 6 to 8, which show, in the form of flowcharts, routines which are executed by the CPU 51 of the ECU 50.

Figure 6:
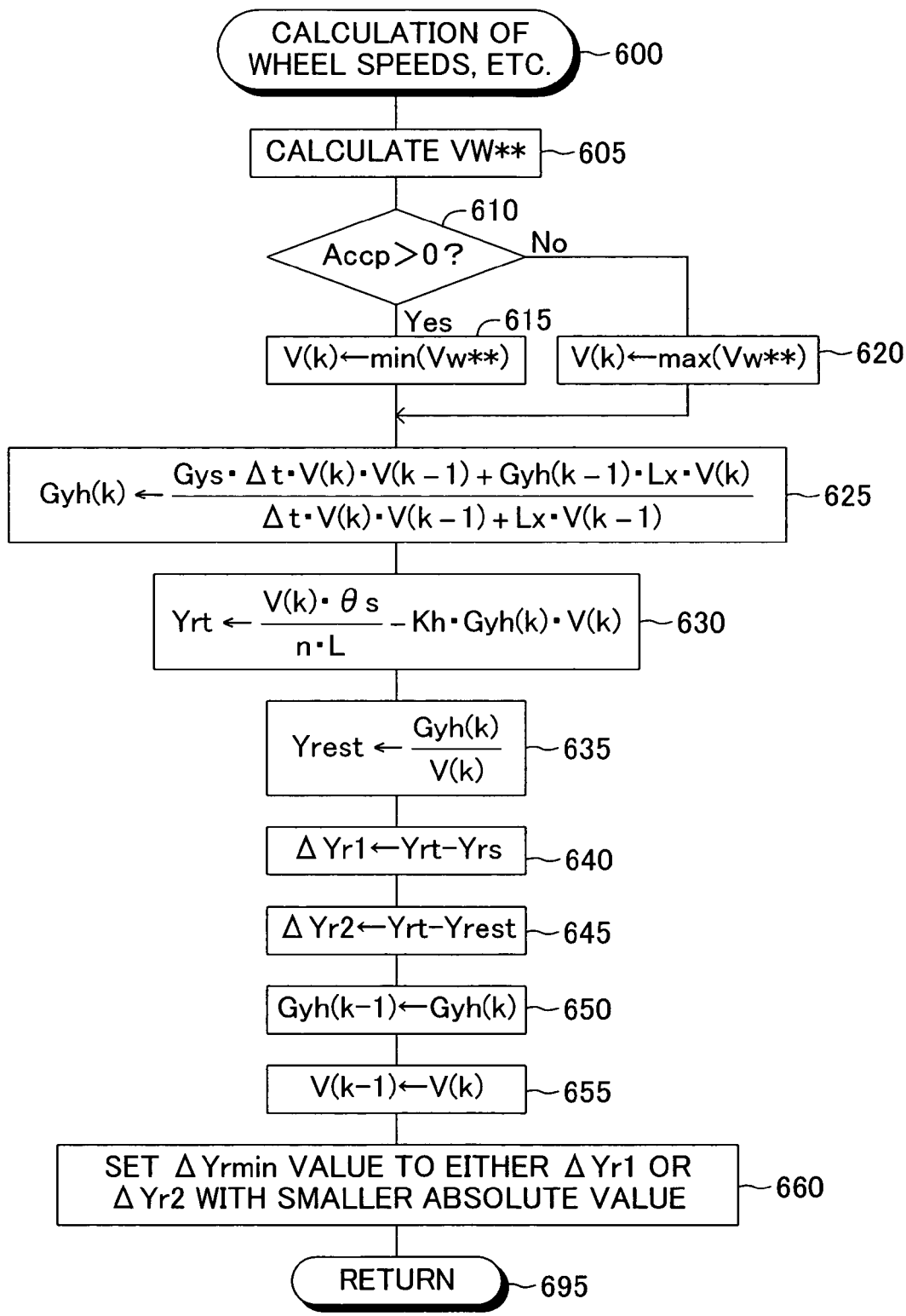
FIG. 6 is a flowchart showing a routine which the CPU shown in FIG. 1 executes in order to calculate a wheel speed, etc.

The CPU 51 repeatedly performs a routine for calculating wheel speeds and the like shown in FIG. 6 at predetermined time intervals (program execution period Δt, for example, 6 msec). Accordingly, when a predetermined timing is reached, the CPU 51 starts processing of the routine from Step 600, and proceeds to Step 605 so as to calculate each wheel speed Vw of the wheel (the speed of the outer periphery of the wheel) at the present time point. Specifically, the CPU 51 calculates the individual wheel speeds Vw on the basis of the fluctuation frequency of a signal output from each wheel speed sensor 61**.

Next, the CPU 51 proceeds to Step 610 so as to determine whether the amount of operation Accp of the accelerator pedal detected by the accelerator opening sensor 62 is greater than "0" (that is, whether the vehicle is in a driven state or a braked state). When the CPU 51 makes a "Yes" determination (when the vehicle is in the driven state), the CPU 51 proceeds to Step 615 so as to set the vehicle speed V(k) to the minimum value of the wheel speeds Vw. On the other hand, when the CPU 51 makes a "No" determination (when the vehicle is in the braked state), the CPU 51 proceeds to Step 620 so as to set the vehicle speed V(k) to the maximum value of the vehicle wheel speeds Vw.

Subsequently, the CPU 51 proceeds to Step 625 so as to determine the corrected center-of-gravity-position lateral acceleration Gyh(k) on the basis of the detected lateral acceleration Gys at the present time point acquired from the lateral acceleration sensor 65, the vehicle speed V(k) which has been set in the above-described Step 615 or Step 620, the vehicle speed V(k−1) which has been set in Step 655 to be described later in the previous execution of the present routine, the corrected center-of-gravity-position lateral acceleration Gyh(k−1) which has been set in Step 650 to be described later in the previous execution of the present routine, and an equation corresponding to the above-described Eq. 6.

Subsequently, the CPU 51 proceeds to Step 630 so as to determine the target yaw rate Yrt on the basis of the above-described vehicle speed V(k), the steering angle θs at the present time point which is acquired from the steering angle sensor 63, the above-described corrected center-of-gravity-position lateral acceleration Gyh(k) and an equation corresponding to the above-described Eq. 7. In the subsequent Step 635, the CPU 51 determines the estimated yaw rate Yrest on the basis of the above-described corrected center-of-gravity-position lateral acceleration Gyh(k), the above-described vehicle speed V(k) and an equation corresponding to the above-described Eq. 10.

Subsequently, the CPU 51 proceeds to Step 640 so as to determine the first yaw rate deviation ΔYr1 on the basis of the target yaw rate Yrt determined in the above-described Step 630, the detected yaw rate Yrs at the present time point acquired from the yaw rate sensor 64, and the above-described Eq. 8. In the subsequent Step 645, the CPU 51 determines the second yaw rate deviation ΔYr2 on the basis of the above-described target yaw rate Yrt, the estimated yaw rate Yrest which has been determined in the above-described Step 635, and the above-described Eq. 9.

Subsequently, the CPU 51 proceeds to Step 650 so as to set and update the corrected center-of-gravity-position lateral acceleration Gyh(k−1) to the corrected center-of-gravity-position lateral acceleration Gyh(k) which has been determined in the above-described Step 625. In the subsequent Step 655, the CPU 51 sets and updates the vehicle speed V(k−1) to the vehicle speed V(k) which has been set in the above-described Step 615 and Step 620.

Subsequently, the CPU 51 proceeds to Step 660 so as to set the yaw rate deviation for control ΔYrmin to either of the first yaw rate deviation ΔYr1 or the second yaw rate deviation ΔYr2 which has a smaller absolute value, and subsequently ends the current execution of the present routine. Hereafter, the CPU 51 also repeatedly executes the present routine at predetermined time intervals Δt, thereby to sequentially update various values.

Figure 7:
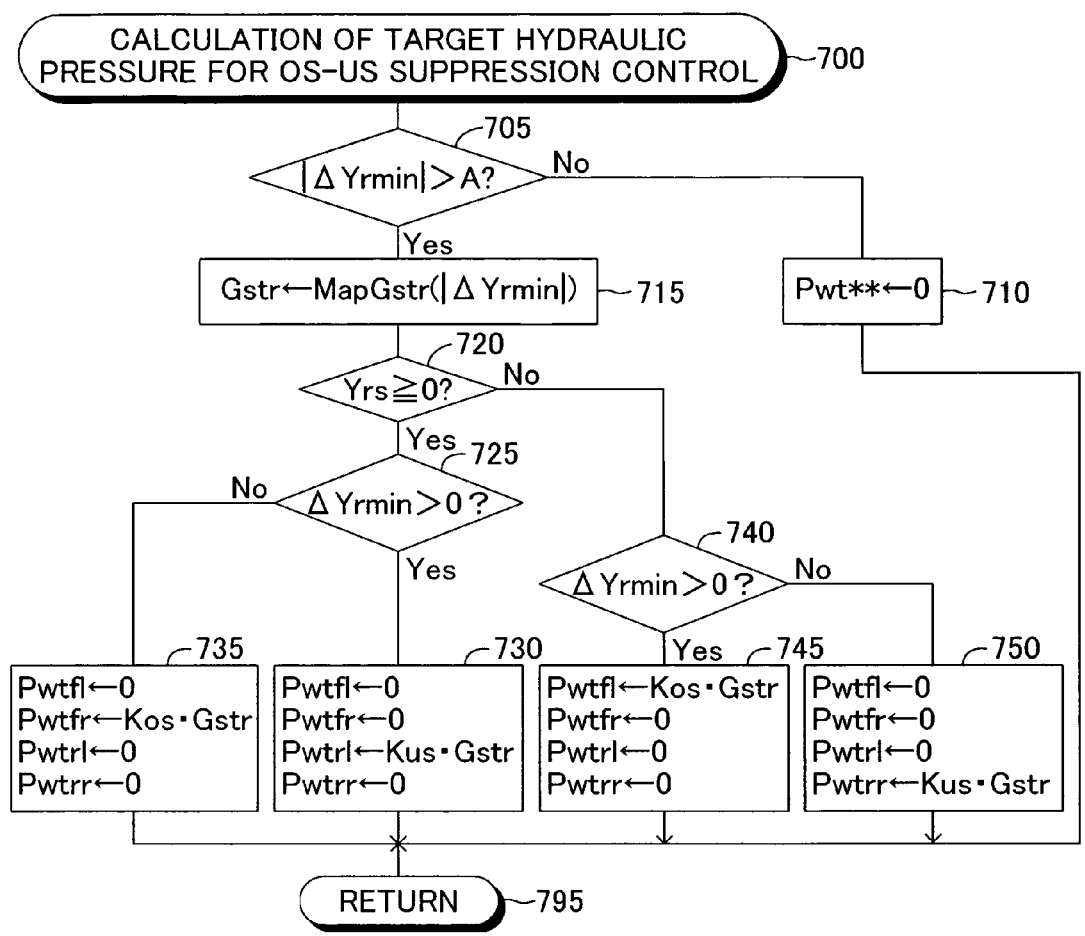
FIG. 7 is a flowchart showing a routine which the CPU shown in FIG. 1 executes in order to set a target hydraulic pressure for an OS-US suppression control.

Further, the CPU 51 repeatedly executes a routine for setting the target hydraulic pressure for the OS-US suppression control shown in FIG. 7 at predetermined time intervals (for example, 6 msec). Accordingly, when a predetermined timing is reached, the CPU 51 starts processing of the routine from Step 700, and proceeds to Step 705 so as to determine whether the absolute value of the yaw rate deviation for control ΔYrmin which has been calculated in Step 660 is greater than a threshold A (which is greater than 0). If the CPU 51 makes a "No" determination, (that is, when it determines that the vehicle is in neither the OS state nor the US state), the CPU 51 proceeds to Step 710 so as to set the target hydraulic pressures Pwt** for all wheels to "0." Subsequently, the CPU 51 immediately proceeds to Step 795 so as to end the current execution of the present routine.

Now, when it is assumed that the absolute value of the yaw rate deviation for control ΔYrmin is greater than the threshold A (that is, when the CPU 51 determines that the vehicle is in the OS state or the US state), the CPU 51 makes a "Yes" determination in Step 705 and proceeds to Step 715 so as to determine the control quantity Gstr on the basis of the absolute value |ΔYrmin| of the yaw rate deviation for control ΔYrmin and a table MapGstr which has been prepared in advance for defining the relationship between the |ΔYrmin| and the control quantity Gstr. As a result, the control quantity Gstr (which is greater than 0) is set in such a manner that it increases as the absolute value |ΔYrmin| of the yaw rate deviation for control increases.

Subsequently, the CPU 51 proceeds to Step 720 so as to determine whether or not the yaw rate detected by the yaw rate sensor 64 is equal to or greater than "0" (that is, whether the turning direction is the left direction or the right direction).

Now, the description is continued on the assumption that the vehicle is turning left. In this case, the CPU 51 makes a "Yes" determination in Step 720 and proceeds to Step 725 so as to determine whether the yaw rate deviation for control ΔYrmin is greater than "0" (accordingly, whether the value is greater than A or smaller than −A.)

Here, in the case where the vehicle is turning left, the yaw rate deviation for control ΔYrmin being greater than the threshold A means a greater turning radius compared to the case where the real yaw rate of the vehicle is assumed to be equal to the target yaw rate Yrt. In this case, the present apparatus determines that the vehicle is in the under-steer state.

Accordingly, in the case where the CPU 51 makes a "Yes" determination in Step 725 (that is, when the vehicle enters the under-steer state while it is turning left), the CPU 51 proceeds to Step 730 so as to set the target hydraulic pressure PWtrl for the rear left wheel RL, which is located inner side of the turning locus, to a value determined by multiplying the above-determined control quantity Gstr and a coefficient Kus for the US suppression control (a positive constant) and set the target hydraulic pressures Pwt** for the other three wheels to "0." Subsequently, the CPU 51 proceeds to Step 795 so as to end the current execution of the present routine. Accordingly, the target hydraulic pressure Pwt** for the rear left wheel RL, which is located inner side of the turning locus, is set to a value (>0) corresponding to (the absolute value of) the yaw rate deviation for control ΔYrmin.

On the other hand, in the case where the vehicle is turning left, the yaw rate deviation for control ΔYrmin being smaller than −A means a smaller turning radius compared to the case where the real yaw rate of the vehicle is assumed to be equal to the target yaw rate Yrt. In this case, the present apparatus determines that the vehicle is in the over-steer state.

Accordingly, in the case where the CPU 51 makes a "No" determination in Step 725 (that is, when the vehicle enters the over-steer state when the vehicle is turning left), the CPU 51 proceeds to Step 735 so as to set the target hydraulic pressure Pwtfr for the front right wheel FR, which is located outer side of the turning locus, to a value determined by multiplying the above-determined control quantity Gstr and a coefficient Kos (a positive constant) for the OS suppression control and set the target hydraulic pressures Pwt for the other three wheels to "0." Subsequently, the CPU 51 proceeds to Step 795 so as to end the current execution of the present routine. Accordingly, the target hydraulic pressure Pwt for the front right wheel FR, which is located outer side of the turning locus, is set to a value (>0) corresponding to (the absolute value of) the yaw rate deviation for control ΔYrmin.

Next, description will be given for the case where the vehicle is turning right. In this case, the CPU 51 makes a "No" determination in Step 720 and proceeds to Step 740 so as to determine whether the yaw rate deviation for control ΔYrmin is greater than "0" (and therefore, whether the yaw rate deviation for control ΔYrmin is greater than A or smaller than −A.)

Here, in the case where the vehicle is turning right, the yaw rate deviation for control ΔYrmin being greater than A means a smaller turning radius compared to the case where the real yaw rate of the vehicle is assumed to be equal to the target yaw rate Yrt. In this case, the present apparatus determines that the vehicle is in the over-steer state.

Accordingly, in the case where the CPU 51 makes a "Yes" determination in Step 740 (that is, when the vehicle enters the over-steer state while it is turning right), the CPU 51 proceeds to Step 745 so as to set the target hydraulic pressure Pwtfl for the front left wheel FL, which is located outer side of the turning locus, to a value determined by multiplying the above-determined control quantity Gstr and a coefficient Kos for the OS suppression control and set the target hydraulic pressures Pwt for the other three wheels to "0." Subsequently, the CPU 51 proceeds to Step 795 so as to end the current execution of the present routine. Accordingly, the target hydraulic pressure Pwt for the front left wheel FL, which is located outer side of the turning locus, is set to a value (>0) corresponding to (the absolute value of) the yaw rate deviation for control ΔYrmin.

On the other hand, in the case where the vehicle is turning right, the yaw rate deviation for control ΔYrmin being smaller than −A means a greater turning radius compared to the case where the real yaw rate of the vehicle is assumed to be equal to the target yaw rate Yrt. In this case, the present apparatus determines that the vehicle is in the under-steer state.

Accordingly, in the case where the CPU 51 makes a "No" determination in Step 740 (that is, when the vehicle enters the under-steer state while it is turning right), the CPU 51 proceeds to Step 750 so as to set the target hydraulic pressure Pwtrr for the rear right wheel RR, which is located inner side of the turning locus, to a value determined by multiplying the above-determined control quantity Gstr and a coefficient Kus for the US suppression control and set the target hydraulic pressures Pwt for the other three wheels to "0." Subsequently, the CPU 51 proceeds to Step 795 so as to end the current execution of the present routine. Accordingly, the target hydraulic pressure Pwt for the rear right wheel RR, which is located inner side of the turning locus, is set to a value (>0) corresponding to (the absolute value of) the yaw rate deviation for control ΔYrmin.

Figure 8:
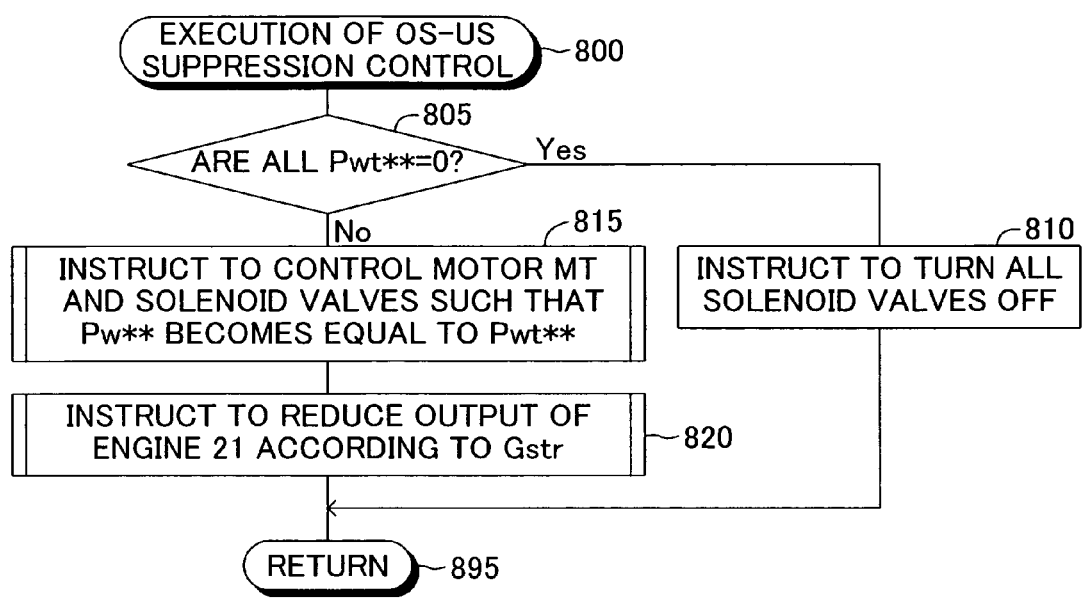
FIG. 8 is a flowchart showing a routine which the CPU shown in FIG. 1 executes in order to perform the OS-US suppression control.

Further, the CPU 51 repeatedly executes the routine for executing the OS-US suppression control as shown in FIG. 8 at predetermined time intervals (for example, 6 msec). The execution of the present routine enables achieving the function of the vehicle stabilization control execution means.

Accordingly, when a predetermined timing is reached, the CPU 51 starts processing of the routine from Step 800, and proceeds to Step 805 so as to determine whether or not the target hydraulic pressures Pwt of all wheels are "0." When the CPU 51 makes a "Yes" determination, the CPU 51 proceeds to Step 810 so as to bring all solenoid valves of the HU 40 into their non-excited states, to give an instruction for brining the motor MT into the non-drive state, and immediately proceeds to Step 895** so as to end the current execution of the present routine.

On the contrary, in the case where the CPU 51 makes a "No" determination in Step 805, the CPU 51 proceeds to Step 815 so as to give a control instruction to the solenoid valves and the motor MT of the HU 40 in such a manner that the wheel cylinder pressures Pw of the wheel become the target hydraulic pressures Pwt which have been respectively set in the routine shown in FIG. 7. Note that in the case where the brake pedal BP is being operated, the target hydraulic pressure Pwt is set to a value which is higher than the value set in the routine as shown in FIG. 7 by an amount corresponding to the master cylinder pressure Pm.

Accordingly, in the case where it is determined that the vehicle is in the under-steer state, braking force caused by the brake hydraulic pressure corresponding to the above-described control quantity Gstr (≠0) is applied to the rear wheel located on the inner side of the turning locus. Accordingly, a yawing moment in the same direction as the yawing direction is forcibly generated in the vehicle. Therefore, control is performed in such a manner that the absolute value of the yaw rate increases, and the detected yaw rate Yrs and the estimated yaw rate Yrest get closer to the target yaw rate Yrt. As a result, the turning-locus tracing performance of the vehicle can be maintained.

On the other hand, in the case where it is determined that the vehicle is in the over-steer state, braking force caused by the brake hydraulic pressure corresponding to the above-described control quantity Gstr (≠0) is applied to the front wheel on the outer side of the turning locus. Accordingly, a yawing moment in the opposite direction to the yawing direction is forcibly generated in the vehicle. Therefore, the absolute value of the yaw rate decreases, and control is performed in such a manner that the detected yaw rate Yrs and the estimated yaw rate Yrest get closer to the target yaw rate Yrt. As a result, the turning stability of the vehicle can be maintained. Accordingly, the OS-US suppression control on the basis of application of braking force caused by braking hydraulic pressure is achieved.

Subsequently, the CPU 51 proceeds to Step 820 so as to give an instruction to decrease the output of the engine 21 by an amount corresponding to the control quantity GStr which has been determined in the above-described Step 715. Subsequently, the CPU 51 proceeds to Step 895 so as to end the current execution of the present routine. Specifically, the CPU 51 executes an engine output reduction control for decreasing the output of the engine 21 from a value corresponding to the amount of operation Accp of the accelerator by a predetermined amount.

As a result of the above-described control, the vehicle speed decreases, and thus the centrifugal force acting on the vehicle decreases, whereby the turning-locus tracing performance and turning stability of the vehicle can be maintained. As described above, under the OS-US suppression control in the present embodiment, in addition to the braking force caused by the braking hydraulic pressure being applied, the engine output reduction control is performed.

As described above, the motion control apparatus for a vehicle including the center-of-gravity-position lateral acceleration acquisition apparatus according to the first embodiment of the present invention is applied to a vehicle equipped with the lateral acceleration sensor 65 at a position remote from the center of gravity G of the vehicle. The apparatus determines the lateral acceleration at the center of gravity of the vehicle (the corrected center-of-gravity-position lateral acceleration Gyh) through correction of the detected lateral acceleration Gys using a relationship (see the above-described Eq. 6) obtained from the first relationship (see the above described Eq. 1 and Eq. 2) and the second relationship (see the above-described Eq. 3) but without using the yaw rate detected by the yaw rate sensor 64. The first relationship holds among the yaw rate of the vehicle, the lateral acceleration at the center of gravity of the vehicle, and the detected lateral acceleration Gys acquired by the lateral acceleration sensor 65. In addition, the second relationship holds while the vehicle is stably running in which the vehicle is performing orbital motion without performing rotation motion around its axis. Accordingly, even if an anomaly occurs with the yaw rate sensor 64 (and therefore, with the detected yaw rate Yrs), the corrected center-of-gravity-position lateral acceleration Gyh can be continuously calculated with high accuracy.

In addition, the present apparatus calculates two yaw rate deviations $\Delta Yr$; i.e., a first yaw rate deviation $\Delta Yr1$ which is affected by the yaw rate detected by the yaw rate sensor 64 (see the above described Eq. 8), and the second yaw rate deviation $\Delta Yr2$ which is not affected by the detected yaw rate Yrs (see the above described Eq. 9). Subsequently, the apparatus determines the start of the OS-US suppression control and determines the hydraulic braking force (the control quantity Gstr) by the OS-US suppression control on the basis of either one of the two yaw rate deviations which has a smaller absolute value (yaw rate deviation for control $\Delta Yr\text{min}$).

Accordingly, even if an anomaly occurs with the yaw rate sensor 64 (and therefore, with the detected yaw rate Yrs) causing the situation where the first yaw rate deviation $\Delta Yr1$ is calculated as a value which is greater than an appropriate value, the hydraulic braking force under the OS-US suppression control is determined on the basis of the second yaw rate deviation $\Delta Yr2$ (which is smaller than the first yaw rate deviation $\Delta Yr1$) which can be maintained at an appropriate value. This makes it possible to prevent the state where the hydraulic braking force is calculated as an excessively large value or the like because of occurrence of anomaly of the yaw rate sensor 64. In other words, under the OS-US suppression control, redundancy can be provided so as to cope with anomaly of the yaw rate sensor 64.

Second Embodiment

Next, a motion control apparatus for a vehicle including a center-of-gravity-position lateral acceleration acquisition apparatus according to a second embodiment of the present invention will be described. The second embodiment differs from the first embodiment only in the method of providing redundancy so as to cope with anomaly of the yaw rate sensor 64 under the OS-US suppression control. Accordingly, such difference will be described.

In the above-described first embodiment, to provide redundancy so as to cope with anomaly of the yaw rate sensor 64 under the OS-US suppression control, the apparatus determines start of the OS-US suppression control and determines the hydraulic braking force (the control quantity Gstr) under the OS-US suppression control, on the basis of either one of the two yaw rate deviations $\Delta Yr$; i.e., the first yaw rate deviation $\Delta Yr1$ (see the above-described Eq. 8) and the second yaw rate deviation $\Delta Yr2$ (see the above-described Eq. 9), which has a smaller absolute value.

In the second embodiment, on the contrary, the OS-US suppression control is started in the case where both the absolute value of the first yaw rate deviation $\Delta Yr1$ and the absolute value of the second yaw rate deviation $\Delta Yr2$ are greater than a threshold B (which is greater than 0). In addition, the control quantity Gstr under the OS-US suppression control is determined in accordance with the vehicle body slip angle $\beta$ as well as the first yaw rate deviation $\Delta Yr1$, which will be described later. The details of this operation will be described referring to the flowchart to be described later.

Actual Operation of the Second Embodiment

Hereinafter, the actual operation of the motion control apparatus according to the second embodiment will be described. Among the routines as shown in FIGS. 6 to 8 executed by the CPU 51 of the first embodiment, the CPU 51 of the ECU 50 of the present apparatus executes the routine shown in FIG. 8 as it is, and in place of the routines shown in FIGS. 6 and 7, the CPU 51 executes the routines shown in the flowcharts of FIGS. 9 and 10 which correspond to the FIGS. 6 and 7, respectively. Hereinafter, the routines shown in FIGS. 9 and 10 which are unique to the second embodiment will be described. Note that in the routines shown in FIGS. 9 and 10, steps for executing the same processing as those in the steps of the previously described routines are denoted by the same step numbers as those of the corresponding steps of the previously described routines.

Figure 9:
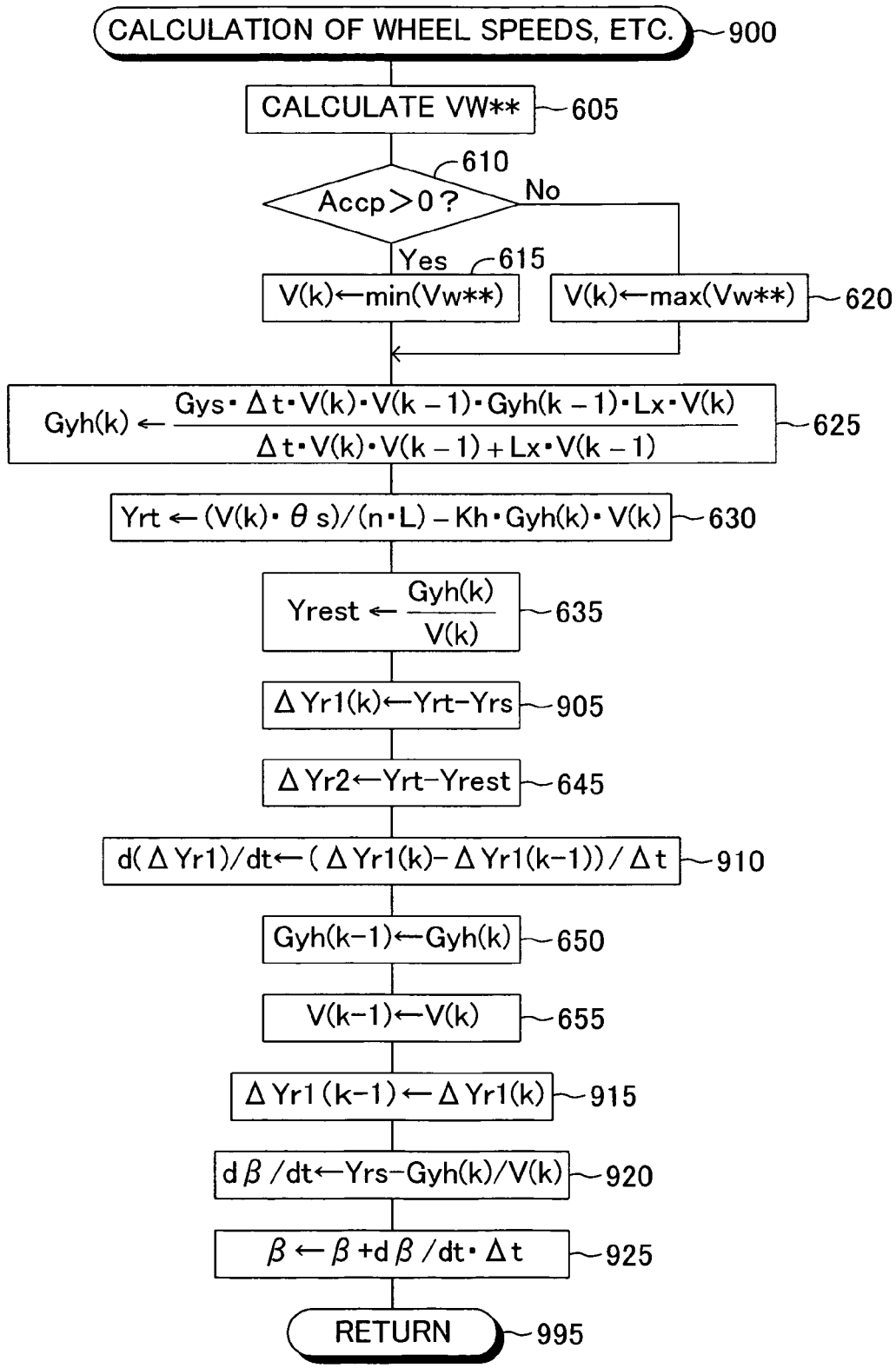
FIG. 9 is a flowchart showing a routine which the CPU of a motion control apparatus for a vehicle according to a second embodiment of the present invention in order to calculate a wheel speed, etc.

The CPU 51 of the present apparatus repeatedly executes the routine for calculating the wheel speed and the like shown in FIG. 9 at predetermined time intervals. The routine shown in FIG. 9 differs from the routine shown in FIG. 6 only in that the step 640 of the routine shown in FIG. 6 has been replaced with Step 905 and that Step 660 of the routine shown in FIG. 6 has been deleted, and Steps 910 to 925 have been added.

Step 905 differs from Step 640 of FIG. 6 only in that (the present value of) the first yaw rate deviation is represented as $\Delta Yr1(k)$ using a subscript (k).

In Step 910, a time-differentiated value $d(\Delta Yr1)/dt$ of the first yaw rate deviation $\Delta Yr1$ is determined according to the equation described in Step 910. In the equation in Step 910, a value which has been updated in Step 915 in the previous execution of the present routine is used as (the previous value) of the first yaw rate deviation $\Delta Yr1(k-1)$.

In Step 920, a time-differentiated value $d\beta/dt$ of the vehicle body slip angle $\beta$ is determined according to the equation described in Step 920. In Step 925, the vehicle body slip angle $\beta$ is determined by integrating (with time) the time-differentiated value $d\beta/dt$ of the vehicle body slip angle $\beta$ which has been calculated in Step 920.

Figure 10:
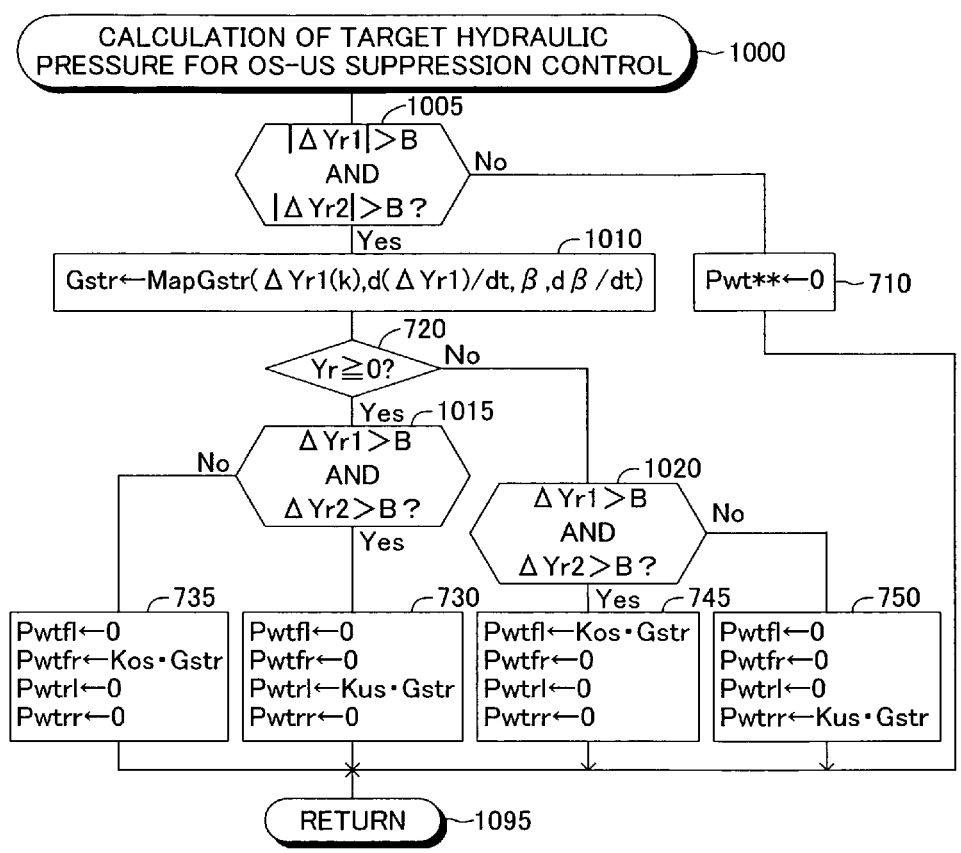
FIG. 10 is a flowchart showing a routine which the CPU of the motion control apparatus for a vehicle according to the second embodiment of the present invention in order to set a target hydraulic pressure for an OS-US suppression control.

Further, the CPU 51 repeatedly executes a routine for setting the target hydraulic pressures for the OS-US suppression control shown in FIG. 10 at predetermined time intervals. The routine shown in FIG. 10 differs from the routine shown in FIG. 7 only in that Steps 705, 715, 725 and 740 have been replaced with Steps 1005, 1010, 1015 and 1020, respectively.

In Step 1005, it is determined whether both the absolute value |ΔYrl| of the first yaw rate deviation ΔYrl and the absolute value |ΔYr2| of the second yaw rate deviation ΔYr2 are greater than the threshold B (which is greater than 0). When a "Yes" determination is made, the OS-US suppression control is started and executed through performance of Step 1010 and subsequent steps.

In Step 1010, the control quantity Gstr is determined on the basis of the first yaw rate deviation ΔYrl(k), the time-differentiated value d(ΔYrl)/dt of the first yaw rate deviation, the vehicle body slip angle β, the time-differentiated value dβ/dt of the vehicle body slip angle, which have been calculated in Steps 905, 910, 925 and 920, respectively, of FIG. 9, and the table MapGstr2 which has been prepared in advance so as to specify the relationship between these values and the control quantity Gstr. Accordingly, the control quantity Gstr (which is greater than 0) is set such that it increases as any of the first yaw rate deviation ΔYrl(k), the time-differentiated value d(ΔYrl)/dt of the first yaw rate deviation, the vehicle body slip angle β, and the time-differentiated value dβ/dt of the vehicular slip angle increases.

Step 1015 is executed when a "Yes" determination is made in Step 720 (that is, when the vehicle is turning left). In Step 1015, it is determined whether both the first yaw rate deviation ΔYr1 and the second yaw rate deviation ΔYr2 are greater than the threshold B (which is greater than 0). When a "Yes" determination is made here (that is, when the vehicle is in the under-steer state while it is turning left), Step 730 is executed. On the other hand, when a "No" determination is made (that is, when the vehicle is in the over-steer state while it is turning left), Step 735 is executed.

Step 1020 is executed when a "No" determination is made in Step 720 (that is, when the vehicle is turning right). In Step 1020, it is determined whether both the first yaw rate deviation ΔYrl and the second yaw rate deviation ΔYr2 are greater than the threshold B (which is greater than 0). When a "Yes" determination is made here (that is, when the vehicle is in the over-steer state while it is turning right), Step 745 is executed. On the other hand, when a "No" determination is made (that is, when the vehicle is in the under-steer state while it is turning right), Step 750 is executed.

As described above, as is the case with, the above-described first embodiment, the motion control apparatus for a vehicle including the center-of-gravity-position lateral acceleration acquisition apparatus according to the second embodiment of the present invention calculates two yaw rate deviations ΔYr: the first yaw rate deviation ΔYrl (see the above-described Eq. 8) which is affected by the yaw rate detected by the yaw rate sensor 64 and the second yaw rate deviation ΔYr2 (see the above-described Eq. 9) which is not affected by the detected yaw rate Yrs. Next, when both absolute values |ΔYr1| and |ΔYr2| are greater than the threshold B, the present apparatus starts the OS-US suppression control and determines the hydraulic braking force under the OS-US suppression control (the control quantity Gstr) on the basis of the first yaw rate deviation ΔYrl(k), the time-differentiated value d(ΔYrl)/dt of the first yaw rate deviation, the vehicle body slip angle β and the time-differentiated value dβ/dt of the vehicle body slip angle.

Accordingly, even if an anomaly occurs with the yaw rate sensor 64 (and therefore, with the detected yaw rate Yrs) and a situation occurs in which the first yaw rate deviation ΔYrl is calculated as a value greater than an appropriate value, the OS-US suppression control is not started so long as the second yaw rate deviation ΔYrs (which is smaller than the first yaw rate deviation ΔYr1) which is not affected by the detected yaw rate Yrs is not in excess of the threshold B. This makes is possible to prevent the state in which the OS-US suppression control is started earlier because of occurrence of anomaly of the yaw rate sensor 64. In other words, redundancy can be provided so as to cope with anomaly of the yaw rate sensor 64 under the OS-US suppression control.

The present invention is not limited to the above-described embodiments, and various modifications may be employed within the scope of the present invention. For example, in each of the above-described embodiments, an equation (see the above-described Eq. 6) for determining the corrected center-of-gravity-position lateral acceleration Gyh through correction of the detected IU-position lateral acceleration Gys without using the yaw rate Yr is obtained, from the above-described Eq. 2 (Gyh=Gys−Lx·dYr/dt) which is obtained by omitting the third term of the right-hand side of the above-described Eq. 1 and from Eq. 3 (Yr=Gyh/V). Instead, an equation for determining the corrected center-of-gravity-position lateral acceleration Gyh through correction of the detected IU-position lateral acceleration Gys without using the yaw rate Yr may be obtained from the above-described Eq. 1 as it is and from the above described Eq. 3.

Further, in each of the above-described embodiments, the estimated yaw rate Yrest calculated in accordance with the above described Eq. 10 is used as the actual yaw rate Yr to determine the second yaw rate deviation ΔYr2 which is not affected by the detected yaw rate Yrs. Instead, an estimated yaw rate determined by dividing a speed difference between left and right wheels ΔVw by the speed V of the vehicle may be used as the actual yaw rate Yr. In this case as well, the second yaw rate deviation ΔYr2 is not affected by the detected yaw rate Yrs.

In addition, in each of the above-described embodiments, the yaw rate detected by the yaw rate sensor 64 is used for determining the turning direction of the vehicle (see Step 720 in FIGS. 7 and 10). The detected IU-position lateral acceleration Gys acquired by the lateral acceleration sensor 65 may be used instead. In addition, the steering angle θs acquired by the steering angle sensor 63 may also be used.

In addition, in each of the above-described embodiments, the over-steer suppression control and the under-steer suppression controls are executed as the vehicle stabilization control. In addition to these controls, or in place of these controls, other controls such as rollover prevention control may be executed.

What is claimed is:

1. A motion control apparatus for a vehicle equipped with a lateral acceleration sensor which is installed at a position remote from the center of gravity of the vehicle and which detects lateral acceleration of the vehicle generated at that position, and a yaw rate sensor for detecting yaw rate of the vehicle, the apparatus comprising:

first calculation means for calculating an estimated yaw rate of the vehicle on the basis of the corrected center-of-gravity-position lateral acceleration obtained by use of a center-of-gravity-position lateral acceleration acquisition apparatus comprising correction means for correcting the detected lateral acceleration by making use of a first relationship among yaw rate of the vehicle, lateral acceleration generated at the center of gravity, and the detected lateral acceleration, and a second relationship between the yaw rate and the lateral acceleration generated at the center of gravity during a predetermined stable travel, the yaw rate being eliminated by combination of the first and second relationships, and acquisition means for acquiring the lateral acceleration generated at the center of gravity, as corrected center-of-gravity-position lateral acceleration, through the correction of the detected lateral acceleration; and motion control means for controlling a vehicle stabilization control for stabilizing motion of the vehicle, while using a first motion state quantity of the vehicle calculated by using the detected yaw rate and a second motion state quantity of the vehicle calculated by using the estimated yaw rate.

2. A center-of-gravity-position lateral acceleration acquisition apparatus for a vehicle according to claim 1, wherein the correction means corrects the detected lateral acceleration while using, as the second relationship, a relationship that the yaw rate is equal to a value obtained by dividing the lateral acceleration generated at the center of gravity by speed of the vehicle.

3. A center-of-gravity-position lateral acceleration acquisition apparatus for a vehicle according to claim 1, wherein the correction means corrects the detected lateral acceleration while using, as the first relationship, a relationship that the lateral acceleration generated at the center of gravity is equal to a value obtained by adding a first value and a second value to the detected lateral acceleration, the first value being the product of the time-differentiated value of the yaw rate and a first coefficient, the second value being the product of the square of the yaw rate and a second coefficient.

4. A center-of-gravity-position lateral acceleration acquisition apparatus for a vehicle according to claim 3, wherein the correction means corrects the detected lateral acceleration while using, as the first relationship, a relationship obtained by removing the second value from the first relationship.

5. A motion control apparatus for a vehicle according to claim 1, wherein the first calculation means uses, as the estimated yaw rate, a value obtained by dividing the corrected center-of-gravity-position lateral acceleration by speed of the vehicle.

6. A motion control apparatus for a vehicle according to claim 1, further comprising: second calculation means for calculating a target yaw rate of the vehicle on the basis of the speed of the vehicle and a steered angle of steerable wheels of the vehicle, wherein the motion control means uses, as the first motion state quantity, a first yaw rate deviation which is a deviation of the detected yaw rate from the target yaw rate, and uses, as the second motion state quantity, a second yaw rate deviation which is a deviation of the estimated yaw rate from the target yaw rate.

7. A motion control apparatus for a vehicle according to claim 6, wherein the motion control means determines a control quantity associated with the vehicle stabilization control on the basis of a smaller one of the first yaw rate deviation and the second yaw rate deviation.

8. A motion control apparatus for a vehicle according to claim 6, wherein the motion control means starts the vehicle stabilization control when both the first yaw rate deviation and the second yaw rate deviation are greater than a threshold.

9. A center-of-gravity-position lateral acceleration acquisition apparatus for a vehicle according to claim 1, the first relationship is as follows:

$$Gyh = Gys - Lx*dYr/dt$$

Gyh indicating the lateral acceleration generated at the center of gravity, Gys indicating the detected lateral acceleration, Yr indicating the yaw rate, and Lx indicating a deviation of the installation position of the lateral acceleration sensor from the center of gravity in the front-back direction of the vehicle body of the vehicle.

10. A center-of-gravity-position lateral acceleration acquisition apparatus for a vehicle according to claim 1, the second relationship is as follows:

$$Yr = Gyh/V$$

Yr indicating the yaw rate, Gyh indicating the lateral acceleration generated at the center of gravity, and V indicating the speed of the vehicle.

11. A center-of-gravity-position lateral acceleration acquisition apparatus for a vehicle comprising:

correction means for correcting a detected lateral acceleration, detected by a lateral acceleration sensor which is installed at a position remote from the center of gravity of the vehicle and which detects lateral acceleration of the vehicle generated at that position, by making use of a first relationship among yaw rate of the vehicle, lateral acceleration generated at the center of gravity, and the detected lateral acceleration, and a second relationship between the yaw rate and the lateral acceleration generated at the center of gravity during a predetermined stable travel, the yaw rate being eliminated by combination of the first and second relationships;

acquisition means for acquiring the lateral acceleration generated at the center of gravity, as corrected center-of-gravity-position lateral acceleration, through the correction of the detected lateral; and motion control means for controlling a vehicle stabilization control for stabilizing motion of the vehicle, while using the corrected center-of-gravity-position lateral acceleration.

* * * * *